(12) United States Patent
Omura

(10) Patent No.: US 11,825,823 B2
(45) Date of Patent: Nov. 28, 2023

(54) FISHING LINE GUIDE AND FISHING ROD INCLUDING FISHING LINE GUIDE

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

( * ) Notice: Subject to any disclaimer, the term of this patent is extended or adjusted under 35 U.S.C. 154(b) by 245 days.

(21) Appl. No.: 17/182,697

(22) Filed: Feb. 23, 2021

(65) Prior Publication Data
US 2021/0282383 A1 Sep. 16, 2021

(30) Foreign Application Priority Data

Mar. 10, 2020 (KR) .................. 10-2020-0029570
Aug. 21, 2020 (KR) .................. 10-2020-0105284

(51) Int. Cl.
*A01K 87/04* (2006.01)

(52) U.S. Cl.
CPC .................................. *A01K 87/04* (2013.01)

(58) Field of Classification Search
CPC ........ A01K 87/04; A01K 87/00; A01K 87/02; A01K 87/005; A01K 97/00; A01K 91/08;
(Continued)

(56) References Cited

U.S. PATENT DOCUMENTS 5,090,150 A      2/1992   Pirazzini
5,361,529 A  *  11/1994   Lindler .................. A01K 87/04
                                                                43/24
(Continued)

FOREIGN PATENT DOCUMENTS

CN          101773107 A       7/2010
CN          106472446 A       3/2017
(Continued)

OTHER PUBLICATIONS

Japanese Office Action dated Nov. 2, 2021 in Japanese Patent Application No. 2021-035100 (with unedited computer generated English translation), citing documents AA and AO through AT therein, 10 pages.

(Continued)

*Primary Examiner* — Jeffrey R Larsen
(74) *Attorney, Agent, or Firm* — Oblon, McClelland, Maier & Neustadt, L.L.P.

(57) ABSTRACT

A fishing line guide attached to a rod body of a fishing rod is provided. The fishing line guide includes a guide ring through which a fishing line passes, a frame supporting the guide ring, and an attachment portion coupled to the frame and attached to the rod body. The frame has, at a lower end thereof, an attachment foot extending along a longitudinal direction of the rod body. The attachment portion is coupled to the attachment foot and is composed of a resin material. The attachment portion has a through bore to which the rod body is fitted, and a fitting hole to which the attachment foot is fitted. The fitting hole is spaced apart along the longitudinal direction from one end surface of the attachment portion and is formed at an outside of the through bore separately from the through bore in a radial direction.

10 Claims, 23 Drawing Sheets

(58) Field of Classification Search
CPC .................. A01K 91/02; A01K 87/002; A01K 89/01914; A01K 91/053; A01K 97/16; A01K 89/00; A01K 89/015; A01K 89/017
USPC ......... 43/24, 18.1 R, 25, 18.1 HR, 19, 43.13
See application file for complete search history.

(56) References Cited

U.S. PATENT DOCUMENTS

| | | | |
|---|---|---|---|
| 9,713,322 | B2 | 7/2017 | Yamamoto et al. |
| 10,149,465 | B2 | 12/2018 | Omura |
| 2015/0201594 | A1* | 7/2015 | Kawamura ............ A01K 87/04 43/24 |
| 2015/0272096 | A1 | 10/2015 | Yamamoto et al. |
| 2019/0343103 | A1* | 11/2019 | Kim ...................... A01K 87/04 |
| 2020/0037589 | A1 | 2/2020 | Omura |

FOREIGN PATENT DOCUMENTS

| | | | |
|---|---|---|---|
| EP | 0 345 401 | A1 | 12/1989 |
| EP | 3 741 212 | A1 | 11/2020 |
| EP | 3 741 213 | A1 | 11/2020 |
| JP | 3-65130 | A | 3/1991 |
| JP | 8-131032 | A | 5/1996 |
| JP | 11-84 | A | 1/1999 |
| JP | 11-9149 | A | 1/1999 |
| JP | 2003-284455 | A | 10/2003 |
| JP | 4275457 | B2 | 6/2009 |
| JP | 2013-116091 | A | 6/2013 |
| JP | 2015-188319 | A | 11/2015 |
| JP | 2020-18292 | A | 2/2020 |
| KR | 940003784 Y1 * | | 5/1992 ............. A01K 87/00 |
| KR | 1994-0003784 | | 6/1994 |
| KR | 10-2010-0109450 | | 10/2010 |
| KR | 10-1524407 | | 5/2015 |
| KR | 10-1870008 | | 6/2018 |
| KR | 10-1974311 | | 5/2019 |
| KR | 10-2017143 | | 9/2019 |

OTHER PUBLICATIONS

Combined Chinese Office Action and Search Report dated May 9, 2022 in Chinese Patent Application No. 202110259381.5, citing documents AA & AO-AR therein, 17 pages (with English Translation).

* cited by examiner

FISHING LINE GUIDE AND FISHING ROD INCLUDING FISHING LINE GUIDE

CROSS-REFERENCE TO RELATED APPLICATION

This application is based upon and claims the benefit of priorities from Korean Patent Application No. 10-2020-0029570, filed on Mar. 10, 2020, and Korean Patent Application No. 10-2020-0105284, filed on Aug. 21, 2020, the entire contents of which are incorporated herein by reference.

TECHNICAL FIELD

The present disclosure relates to a fishing line guide attached to a rod body of a fishing rod, and a fishing rod including the same.

BACKGROUND

A fishing line guide is attached to a rod body of a fishing rod. The fishing line guide has a guide ring formed so as to allow a fishing line to pass through the guide ring. The fishing line guide can guide the fishing line when casting a fishing rig or when landing a fish. By way of example of the fishing line guide, a thread-wrapping type guide and a movable guide, which can be classified according to a method of attaching to the rod body, are known in the present field.

The thread-wrapping type guide has a metal-made frame supporting the guide ring, and the frame is provided with an attachment foot to be attached to an outer peripheral surface of the rod body. The thread-wrapping type guide is attached to the rod body of the fishing rod by bringing the attachment foot into contact with the outer peripheral surface of the rod body and then wrapping the attachment foot and the rod body by means of a wrapping thread to firmly fix the attachment foot to the rod body.

The movable guide has an annular attachment portion through which the rod body passes. The movable guide is movable along the rod body in the state where the rod body passes through the attachment portion, and the movable guide is fixed to the rod body through interference fit between the attachment portion and the outer peripheral surface of the rod body. In a so-called telescopic type fishing rod among the fishing rods, the movable guide is used on the rod body.

By way of example of the movable guide, Japanese Patent Publication No. 4275457 discloses a movable guide including an annular attachment portion composed of a resin material, and a metal-made frame supporting a guide ring. The annular attachment portion is fixed to the rod body through fitting. The frame has an attachment ring fitting with the attachment portion.

In the conventional movable guide disclosed by the aforementioned patent document, the metal-made frame includes the attachment ring fitting with the resin-made attachment portion, and the frame and the attachment portion are coupled to each other by fitting the attachment portion into the attachment ring of the frame. Accordingly, the frame is designed to have a shape adapted to the outer shape of the attachment portion. And, in order to function as a fishing line guide, the frame must fit with the dedicated attachment portion through the attachment ring. As mentioned above, since the frame is applied to the dedicated attachment portion, a dedicated metal die for working such a frame must be manufactured. Therefore, development time such as design time and metal die manufacturing time, which are required for commercialization of the movable guide, becomes excessive, and it is difficult to reduce the development cost.

The rod body of the fishing rod has an outer diameter gradually decreasing toward a tip side of the fishing rod. In the case where a multiple number of fishing line guides is installed on a telescopic type fishing rod, the attachment portions of the multiple fishing line guides must have different inner diameters, respectively, in order to correspond to various outer diameters of the rod body. Further, the attachment rings of the frames must also have various sizes so as to be adapted to different inner diameters of the attachment portions. Thus, in the conventional movable guide in which the frame fits with the attachment portion by the attachment ring of the frame, a multiple number of metal dies for working a multiple number of metal-made frames having the attachment rings having different diameters must be manufactured. Therefore, the number and cost of the metal dies for working the frames are excessive.

In contrast, in the case of the thread-wrapping type guide, the attachment foot is installed on the rod body by placing the attachment foot on the outer peripheral surface of the rod body and then wrapping the attachment foot and the rod body by the wrapping thread. Since the attachment foot of the thread-wrapping type guide does not need to be adapted to the outer diameter of the rod body with high precision, a plurality of the attachment feet may be formed to have a common size. Thus, the number of the sizes of the attachment feet provided in the thread-wrapping type guides is smaller than the number of the sizes of the attachment rings of the conventional movable guides, and the number of the metal dies for working the thread-wrapping type guide is smaller than the number of the metal dies for working the frames for the conventional movable guide.

The telescopic type fishing rod may have an overall length of 4.5 m to 5.5 m depending on its types. When a fishing line is tangled in the vicinity of a tip of the telescopic type fishing rod, a user cannot easily reach the tangled fishing line with his or her hand. Frequently, the user forcibly pulls the fishing line within the reach of his or her hand and untangles the line tangle. Accordingly, the movable guide installed in the vicinity of the tip of the telescopic type fishing rod must not cause entanglement of the fishing line. If the fishing line is tangled with the frame of the movable guide, the frame and the attachment portion must be assembled so as not to be disassembled.

It is preferable that the movable guide installed in the vicinity of the tip of the fishing rod be reduced in weight even by 1 gram. Thus, to reduce the weight of the movable guide, and to satisfy the functions of the movable guide installed in the vicinity of the tip of the fishing rod, it is important that the frame and the attachment portion are assembled through an assembly structure for not only contributing to weight reduction but also showing a strong coupling force.

SUMMARY

Disclosed embodiments provide a fishing line guide that solves at least one or more of the aforementioned problems of the conventional technology. One embodiment provides a fishing line guide which can shorten development time of a movable guide such as design time and metal die manufacturing time required for commercialization of the movable guide. One embodiment provides a fishing line guide which can reduce the number and cost of metal dies for working a frame. One embodiment provides a fishing line guide which does not cause entanglement of a fishing line and does not cause damage even if the fishing line is tangled with the frame. One embodiment provides a fishing line guide in which a frame and an attachment portion are coupled to each other through an assembly structure contributing to weight reduction and showing a strong coupling force. One embodiment provides a fishing line guide which is attached to a rod body disposed at a tip side of a fishing rod and satisfies the functions required in the vicinity of the tip. Further, one embodiment provides a fishing rod which includes the above-described fishing line guide.

One aspect of the disclosed embodiments relates to a fishing line guide which is attached to a rod body of a fishing rod. The fishing line guide according to one embodiment includes a guide ring through which a fishing line passes, a frame configured to support the guide ring, and an attachment portion coupled to the frame and attached to the rod body. The frame has, at a lower end thereof, an attachment foot extending along a longitudinal direction of the rod body. The attachment portion is composed of a resin material, and has a through bore to which the rod body is fitted in the longitudinal direction. The attachment portion is coupled to the attachment foot of the frame. The attachment portion has a fitting hole to which the attachment foot is fitted. The fitting hole is spaced apart along the longitudinal direction from one end surface of the attachment portion in the longitudinal direction and is formed at an outside of the through bore separately from the through bore in a radial direction.

In one embodiment, the attachment portion includes a pair of ridges. The pair of ridges protrude from an outer peripheral surface of the attachment portion outwardly in the radial direction between the one end surface and the fitting hole, and are spaced apart from each other in a width direction orthogonal to the longitudinal direction. Each of the pair of ridges is formed so as to contact a lateral surface of the frame which is located adjacent to the attachment foot fitted to the fitting hole.

In one embodiment, the attachment portion includes a pressing portion protruding toward the frame along the longitudinal direction above the fitting hole. The pressing portion has a protruding end. The protruding end defines an adhesive space, in which a portion of an adhesive agent accommodated in the fitting hole is disposed, between the pressing portion and a surface of the frame located opposite the pressing portion along the longitudinal direction.

In one embodiment, the frame has, in the aforesaid surface, a concave portion having a shape complementary to the protruding end of the pressing portion. The protruding end and the concave portion are bonded at the adhesive space by the portion of the adhesive agent.

In one embodiment, the frame includes a support leg configured to support the guide ring and to connect with the attachment foot by being bent with respect to the attachment foot. The concave portion is formed between the attachment foot and the support leg.

The fishing line guide according to one embodiment is configured to enable the frame having the same shape and dimension to be coupled to a plurality of attachment portions having through bores having different inner diameters.

In one embodiment, a ratio of an overall width to an overall length of the attachment foot is in the range of 1:1.15 to 1:1.8. The attachment foot according to one embodiment may be manufactured from a thread-wrapping type attachment foot. The thread-wrapping type attachment foot is configured not to be coupled to the attachment portion and to be directly attached to an outer peripheral surface of the rod body by a wrapping thread, and has an overall length of 1.6 times to 2 times of the overall length of the attachment foot.

Another aspect of the disclosed embodiments relates to a fishing rod. The fishing rod according to one embodiment includes a plurality of rod bodes interconnected in a longitudinal direction, and the fishing line guide according to one embodiment. The fishing line guide is attached to the rod body disposed at a tip side among the plurality of rod bodies.

The fishing line guide of one embodiment can realize weight reduction while making better the coupling strength between the frame and the attachment portion. The fishing line guide of one embodiment can prevent the occurrence of a line tangle of a fishing line and can prevent damage even if the fishing line is tangled with the frame. According to the fishing line guide of one embodiment, the fitting hole of the attachment portion, to which the frame is fitted, is formed with a single dimension, but the inner diameters of the attachment portion through which the rod body of the fishing rod passes can be set with various dimensions. Therefore, the fitting holes are designed so as to have the same size in the attachment portions having various inner diameters, and the frames having the same size can be coupled to the attachment portions having various inner diameters. Accordingly, it is possible to shorten development time such as metal die designing time and metal die manufacturing time required for commercialization of the fishing line guide, and to reduce the number and cost of the metal dies for working the frame. The fishing line guide of one embodiment can be effectively applied to the rod body which is disposed at tip side, and in which guide rings of the same size and frames of the same size may be employed.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
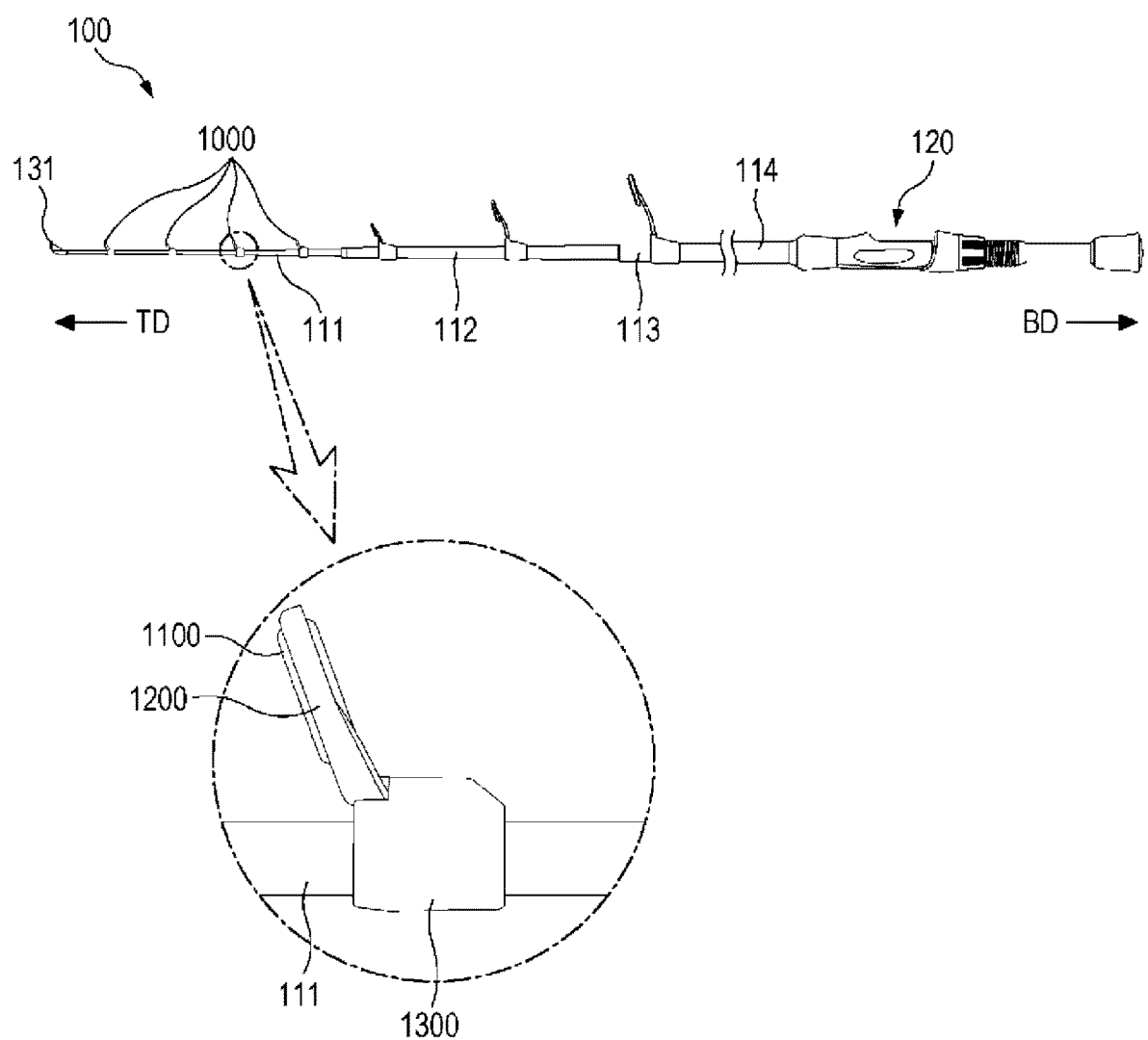
FIG. 1 is a side view showing an example of a fishing rod including a fishing line guide according to one embodiment of the present disclosure.
Figure 2:
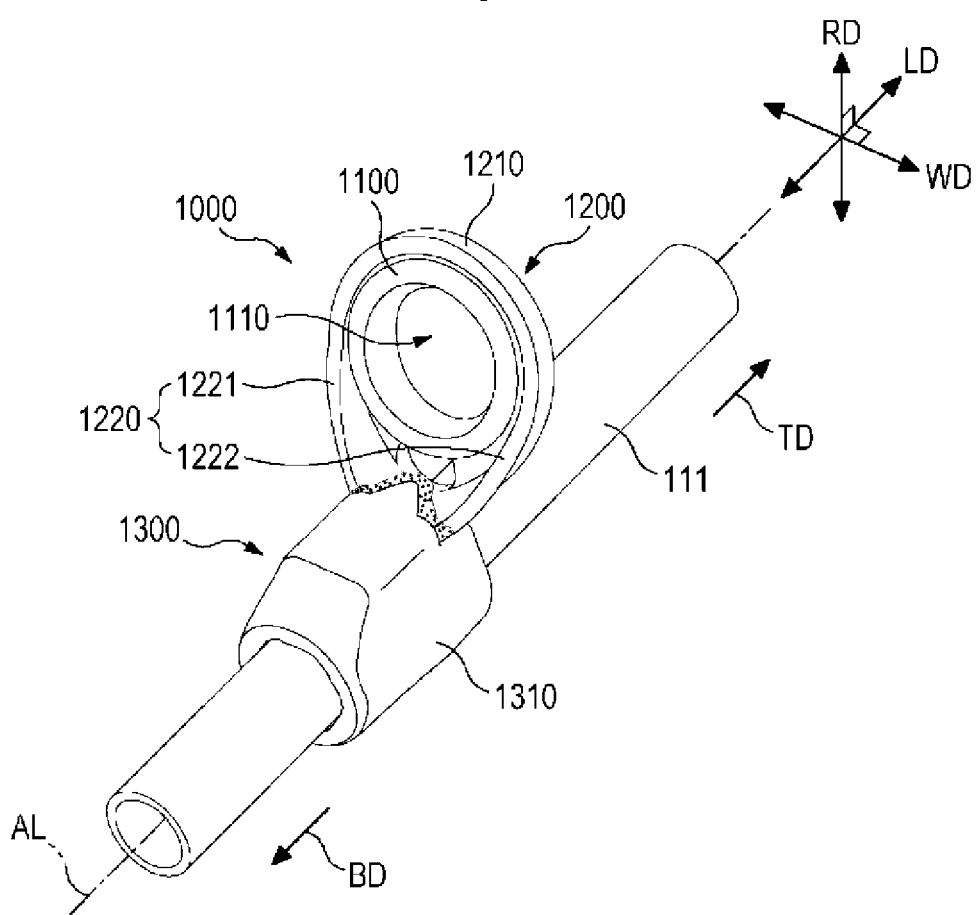
FIG. 2 is a rear perspective view showing a fishing line guide according to one embodiment.

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

The expressions such as "comprising," "including," "having," and the like used in the present disclosure are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will also be applied to the singular expressions recited in the claims.

The expressions such as "first," "second," etc. used in the present disclosure are used to separate a plurality of elements from each other, and are not intended to limit an order or importance of the elements.

In the present disclosure, the description that one element is "connected" or "coupled" to another element should be understood to indicate that the aforesaid one element may be directly connected, or coupled, to the aforesaid another element, and should be further understood that the aforesaid one element may be connected or coupled to the aforesaid another element via a new element.

The dimensional and numerical values described in the present disclosure are not limited only to the dimensional and numerical values that are described herein. Unless specified otherwise, the dimensional and numerical values may be understood to mean the described values and the equivalent ranges including the values.

The directional terms "frontward," "front" and the like used in the present disclosure mean a direction directed toward a tip of a fishing rod, while the directional terms "rearward," "rear" and the like mean a direction directed toward a butt of a fishing rod. Further, the directional terms "upward," "upper," and the like used in the present disclosure are based on a direction in which a guide ring is positioned with respect to a rod body of a fishing rod in the accompanying drawings, while the directional terms "downward," "lower," and the like mean a direction opposite to the upward direction. The fishing rod may be used in the directions different from the direction shown in the accompanying drawings, and the upward direction and the downward direction may be construed accordingly.

Descriptions are made hereinafter as to the embodiments of the present disclosure with reference to the accompanying drawings. Like reference numerals in the drawings denote like or corresponding elements. Further, in the following description of the embodiments, redundant descriptions for the same or corresponding elements may be omitted. However, even if the descriptions of the elements are omitted, such elements are not intended to be excluded in any embodiment.

FIG. 1 shows an example of a fishing rod including a fishing line guide according to one embodiment of the present disclosure. In FIG. 1, an arrow TD indicates a frontward direction toward a tip of the fishing rod, while an arrow BD indicates a rearward direction toward a butt of the fishing rod.

The fishing rod 100 includes a plurality of rod bodies which are capable of elastically deforming in response to external forces applied during fishing and are structures for maintaining a thin and long shape of the fishing rod. Some of the rod bodies may be a thin and long tubular member, while some of the rod bodies may be a cylindrical member that is thin and long but is solid. The plurality of rod bodies may be interconnected by a connection manner such as a joined type or a telescopic type.

The fishing rod 100 shown in FIG. 1 may be referred to as a telescopic type fishing rod in the present field. The plurality of rod bodies are interconnected in a longitudinal direction by a telescopic manner, thereby constituting a main body of the fishing rod 100. According to the telescopic manner, one rod body is fitted to the inside of another rod body, which is located in the rearward direction BD next to the one rod body and has an inner diameter greater than that of the one rod body. The rod bodies interconnected in the telescopic manner can be contracted or extended in the longitudinal direction, and FIG. 1 shows the extended rod bodies of the fishing rod 100.

The plurality of rod bodies shown in FIG. 1 may include rod bodies 111, 112, 113 and 114 which are sequentially disposed from the tip side of the fishing rod toward the butt side of the fishing rod. The rod body 111 is disposed at the tip side of the fishing rod, and may be referred to as a first rod or a tip rod in the present field. The rod body 112 and the rod body 113 may be referred to as a second rod and a third rod in the present field, respectively. The rod body 114 disposed at the butt side of the fishing rod may be referred to as a base rod in the present field. The inner diameters of the rod bodies increase from the rod body 111 (i.e., the first rod) toward the rod body 114 (i.e., the base rod). FIG. 1 illustrates the rod bodies such as the first rod, the second rod, the third rod and the base rod, but the number of the rod bodies disposed between the rod body 111 and the rod body 114 may be varied depending on an overall length required for the fishing rod. A user can grip the rod body 114 located at the butt side. A reel seat 120 is attached to the rod body 114. A reel (not shown) for reeling out a fishing line (not shown) or winding the fishing line is removably mounted on the reel seat 120.

The fishing rod 100 includes a plurality of fishing line guides attached to the rod bodies. A fishing line guide guides the fishing line which is reeled out from the reel when casting a fishing rig or is wound around the reel when landing a fish. The fishing line guide according to one of the various embodiments of the present disclosure may be used as the plurality of fishing line guides. One or more fishing line guides according to one embodiment may be attached to one of the rod bodies (i.e., the rod body 111 to the rod body 114).

As shown in FIG. 1, a plurality of fishing line guides 1000 according to one embodiment are attached to the rod body 111 disposed at the tip side of the fishing rod. The fishing line guide 1000 attached to the rod body 111 (i.e., the first rod) may be referred to as a tip guide in the present field. A top guide 131 is attached to a tip of the rod body 111 so as to protrude therefrom.

Referring to FIG. 1, the fishing line guide according to the embodiments includes a guide ring 1100 configured such that a fishing line (not shown) passes through the guide ring, a frame 1200 configured to support the guide ring 1100, and an attachment portion 1300 coupled to a portion of the frame 1200 and attached to the rod body of the fishing rod (specifically, the rod body 111). In the plurality of the fishing line guides 1000 attached to the rod body 111, the guide rings 1100 and the frames 1200 may have the same size. By way of example, the rod body 111 may have an outer diameter of 1.0 mm to 7.0 mm, and the attachment portions 1300 of the plurality of the fishing line guides 1000 may have various inner diameters corresponding to the aforementioned outer diameter.

The attachment portion 1300 is formed in an annular shape. The fishing line guide 1000 is attached and fixed to the rod body 111 in the state where the rod body 111 passes through the attachment portion 1300 in the longitudinal direction of the rod body. Before the fishing line guide 1000 is fixed to the rod body 111, the attachment portion 1300 of the fishing line guide 1000 can be slid along the rod body 111 in the frontward direction TD or the rearward direction BD, and can be rotated with respect to the rod body 111 in the circumferential direction of the rod body. The rod body 111 takes a tapering shape with the outer diameter gradually decreasing in the frontward direction TD. Thus, as the attachment portion 1300 is moved in the rearward direction BD, the attachment portion 1300 is coupled to an outer peripheral surface of the rod body 111 through interference fit, and the fishing line guide 1000 can be attached and fixed to the rod body 111 thereby. As such, since the attachment portion 1300 is fixed through interference fit after being moved slidably, the fishing line guide according to the embodiments may be referred to as a movable guide or a sliding guide in the present field.

Descriptions are made hereinafter as to the various embodiments of the present disclosure with reference to FIGS. 2 to 29.

Figure 3:
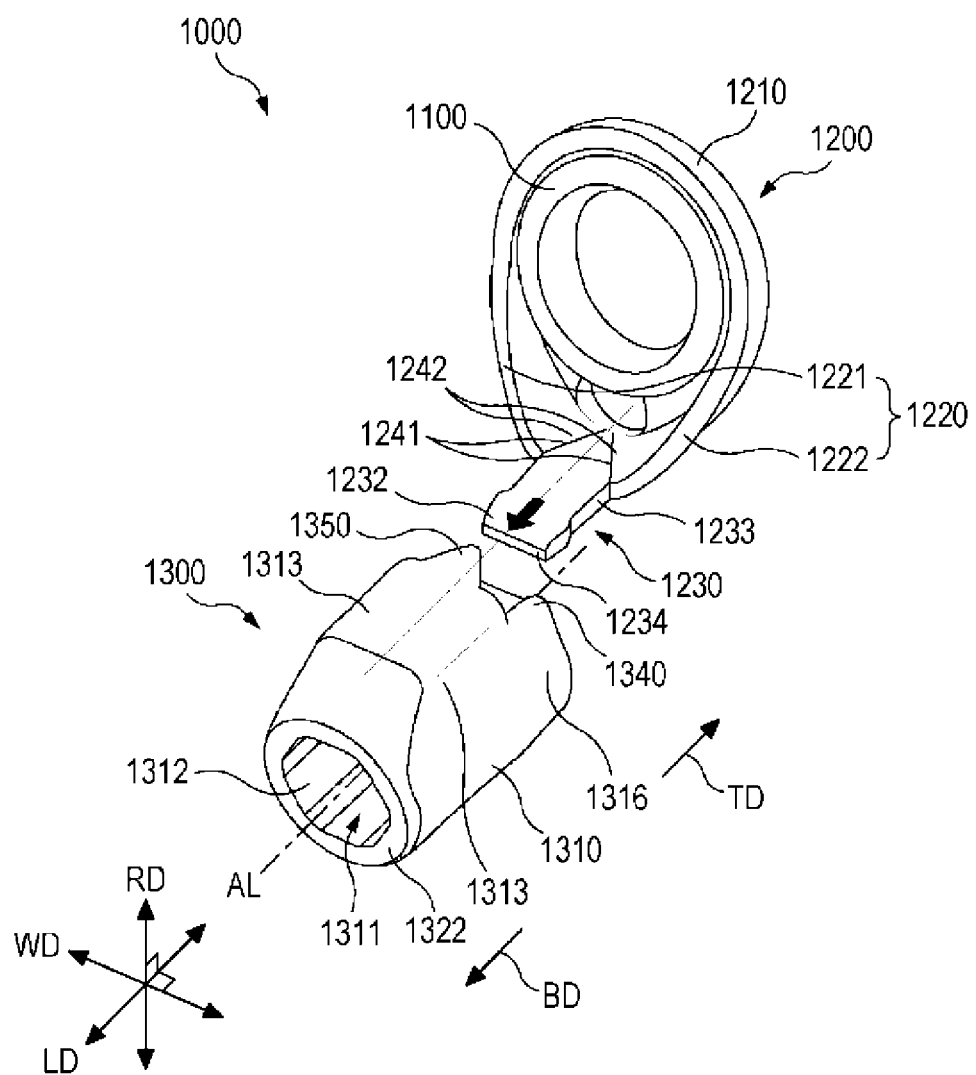
FIG. 3 is an exploded rear perspective view showing the fishing line guide shown in FIG. 2.
Figure 4:
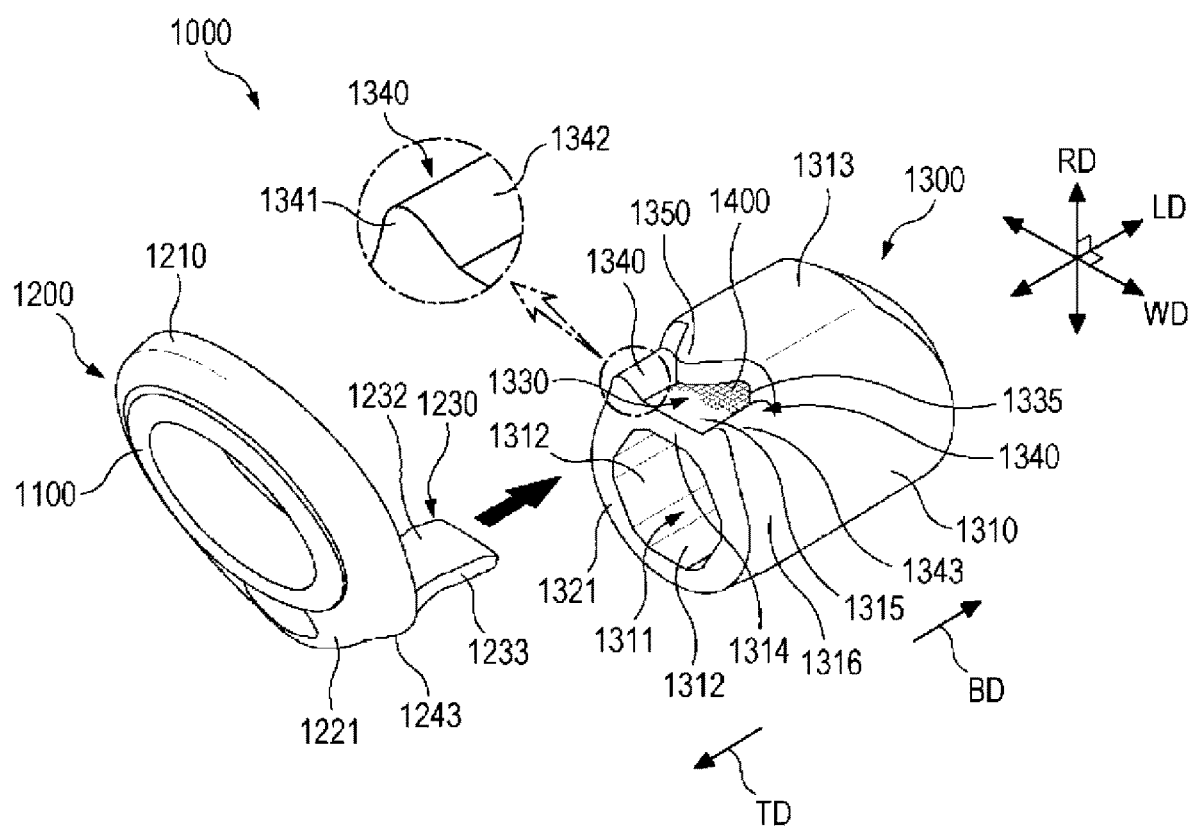
FIG. 4 is an exploded front perspective view showing the fishing line guide shown in FIG. 2.
Figure 7:
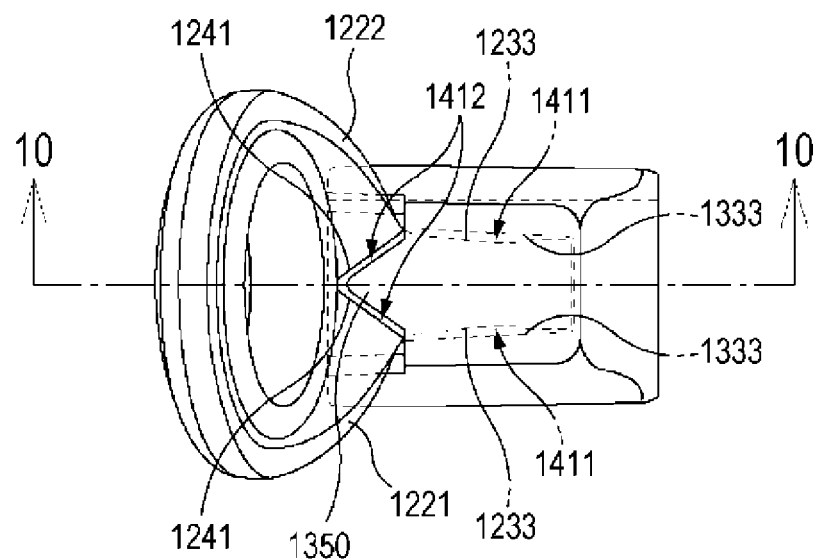
FIG. 7 is a plan view showing some of components in the fishing line guide shown in FIG. 2 by dashed lines.
Figure 8:
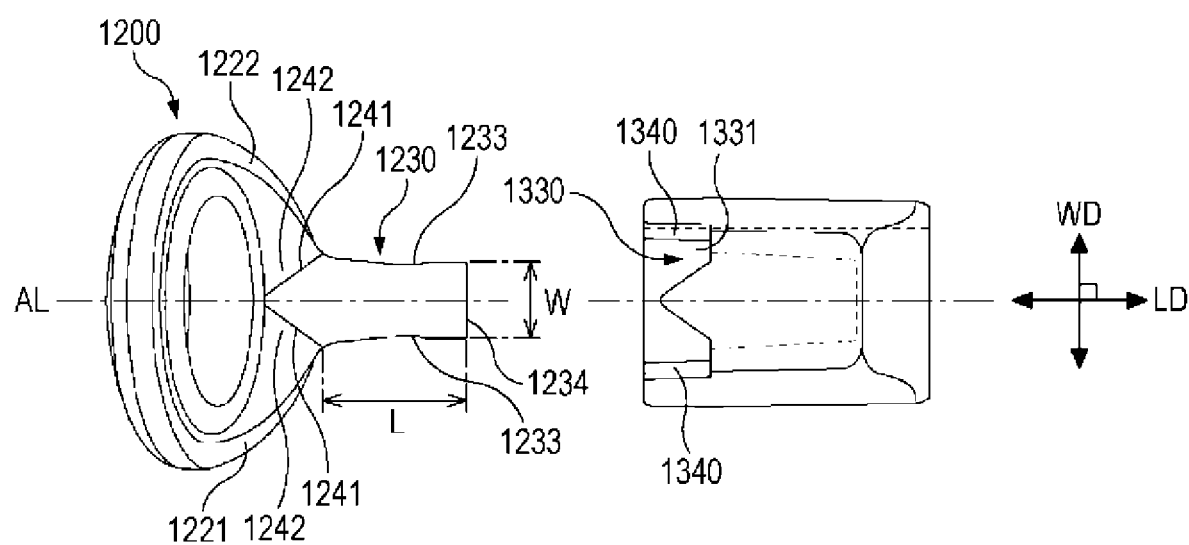
FIG. 8 is a plan view showing that a frame and an attachment portion of the fishing line guide shown in FIG. 2 are separated from each other.
Figure 9:
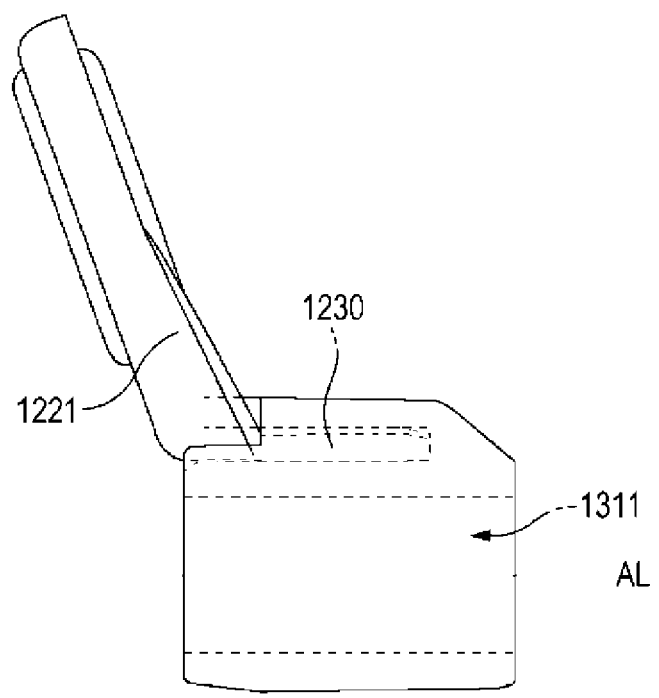
FIG. 9 is a side view showing some of components in the fishing line guide shown in FIG. 2 by dashed lines.
Figure 10:
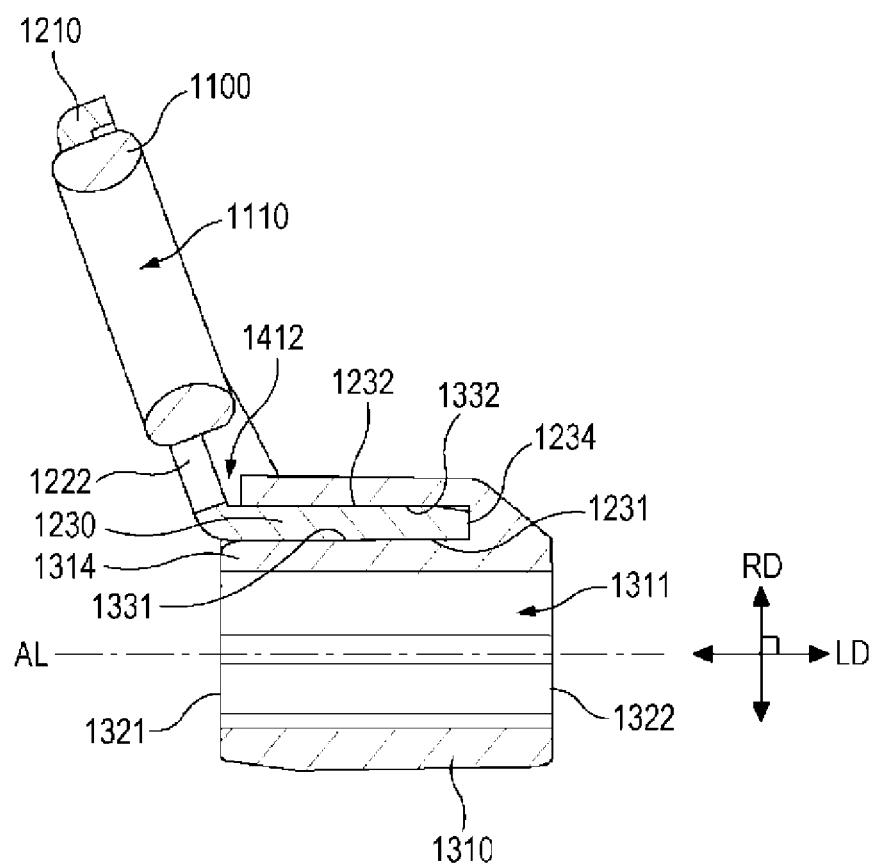
FIG. 10 is a cross-sectional view taken along line 10-10 of FIG. 7.
Figure 11:
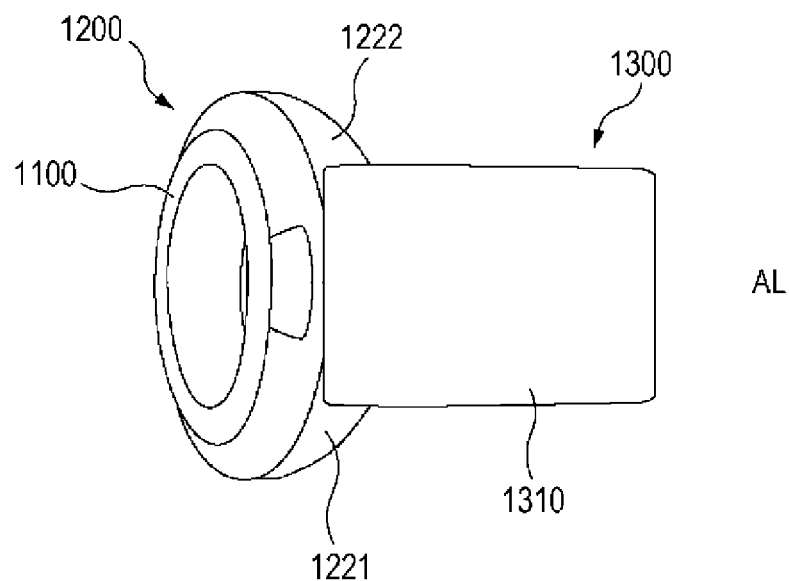
FIG. 11 is a bottom view of the fishing line guide shown in FIG. 2.

FIGS. 2 to 11 show the fishing line guide according to one embodiment. FIGS. 3 and 4 show an example where the fishing line guide is disassembled, and FIG. 10 shows a longitudinal sectional shape of the fishing line guide. In FIGS. 7, 8 and 10, an adhesive agent is omitted for purposes of clearly showing some components of the fishing line guide. FIGS. 12 to 15 show the rod body and a portion of the fishing line guide.

Referring to FIGS. 2 to 14, the fishing line guide 1000 includes the guide ring 1100 through which a fishing line (not shown) passes, the frame 1200 configured to support the guide ring 1100, and the attachment portion 1300 coupled to the frame 1200 and attached to the rod body of the fishing rod (e.g., the rod body 111 shown in FIG. 1).

The guide ring 1100 has a circular or elliptical ring shape, and an opening 1110 defining an inner peripheral surface of the guide ring 1100 is formed in the guide ring 1100. The fishing line passes through the opening 1110 of the guide ring 1100, and can make contact with the inner peripheral surface of the guide ring 1100. The fishing line is guided by the guide ring 1100 along the rod body 111 during fishing. The guide ring 1100 may be coupled to the frame 1200 through fitting and application of an adhesive agent. The guide ring 1100 may be composed of a ceramic material.

The frame 1200 is coupled to the attachment portion 1300 and supports the guide ring 1100. Further, the frame 1200 is configured to hold the guide ring 1100. The frame 1200 may be manufactured by press-working a thin metallic sheet made of a metallic material (e.g., punching, blanking and bending).

In one embodiment, the frame 1200 includes a ring holding portion 1210 configured to hold the guide ring 1100, a support leg 1220 extending from the ring holding portion 1210 toward the attachment portion 1300, and an attachment foot 1230 extending from the support leg 1220 and coupled to the attachment portion 1300. In some embodiment, the frame 1200 may have the attachment foot 1230 directly extending from a lower end of the ring holding portion 1210.

The ring holding portion 1210 is formed in a ring shape. The guide ring 1100 is fitted, at its outer peripheral surface, to an inner peripheral surface of the ring holding portion 1210. The ring holding portion 1210 is integrally formed together with the support leg 1220, and the support leg 1220 extends from the ring holding portion 1210. The support leg 1220 supports the guide ring 1100 held by the ring holding portion 1210. The ring holding portion 1210 may be provided in the frame 1200 so as to be inclined at a predetermined angle in the frontward direction TD.

In this embodiment, the support leg 1220 includes a pair of support legs 1221 and 1222. Each of the support legs 1221 and 1222 extends from the ring holding portion 1210 toward the attachment portion 1300. Each of the support legs 1221 and 1222 extends from a lateral lower end of the ring holding portion 1210 in the downward direction and in the rearward direction.

Each of the support legs 1221 and 1222 connects with the lateral lower end of the ring holding portion 1210 at an upper end thereof. The upper ends of the support legs 1221 and 1222 are spaced apart from each other, thereby forming an opening 1223 (see FIGS. 5 and 6) between the guide ring 1100 and the pair of support legs 1221 and 1222.

Each of the support legs 1221 and 1222 is curved and twisted toward a central axis AL of the rod body 111 (or, a central axis of the attachment portion 1300). Here, the central axis AL of the rod body means an imaginary axial line that extends through a center of a cross-sectional shape of the rod body along the rod body. The direction of the central axis AL may be defined as the longitudinal direction LD of the rod body, and the direction orthogonal to the longitudinal direction LD may be defined as a width direction WD.

The support leg 1220 connects with the attachment foot 1230 by being bent at an obtuse angle with respect to the attachment foot. The support legs 1221 and 1222 approach each other in the vicinity of their respective lower ends, and are connected to each other via the attachment foot 1230. Each of the support legs 1221 and 1222 connects with the attachment foot 1230 by being bent at an obtuse angle with respect to the attachment foot. Due to the bent connection structure between each of the support legs 1221 and 1222 and the attachment foot 1230, the frame 1200 has a concave portion 1241 on its rearward surface. The concave portion 1241 may be formed at a boundary between the attachment foot 1230 and the support leg 1220. The concave portion 1241 may have a V-shape that is convex in the frontward direction TD. As another embodiment, the support leg may be formed as a single member. In such an example, the frame 1200 may be bent in a convex V-shape in the frontward direction or in the rearward direction, and the attachment foot 1230 may extend from a lower end of the support leg which is bent in the V-shape.

The attachment foot 1230 is formed at the lower end of the frame 1200, and extends along the longitudinal direction LD of the rod body. The frame 1200 of this embodiment has the attachment foot 1230 at the lower end of the support leg 1220. The attachment foot 1230 may take a shape of a band having a predetermined width. The cross-sectional shape of the attachment foot 1230 may correspond to a circular arc shape. The attachment foot 1230 may have a lower surface 1231, an upper surface 1232, a pair of lateral surfaces 1233, and an end surface 1234. The lower surface 1231 (see FIG. 10) is flat or is roundly concave with a certain curvature. The upper surface 1232 is located opposite the lower surface 1231 in a thickness direction of the attachment foot. The pair of lateral surfaces 1233 extend between the lower surface 1231 and the upper surface 1232. The end surface 1234 is located at an end of the attachment foot 1230 in the longitudinal direction of the attachment foot, and is approximately orthogonal to the lateral surfaces 1233. The pair of lateral surfaces 1233 may be formed so as to be roundly concave toward the inside of the attachment foot 1230. When the fishing line guide is viewed as shown in FIG. 8, a planar shape of the attachment foot 1230, which is defined by the pair of lateral surfaces 1233 and the end surface 1234, is formed such that a length of the end surface 1234 in the width direction is shorter than a length of a base end of the attachment foot 1230 in the width direction.

As shown in FIG. 8, the attachment foot 1230 has an overall length L and an overall width W. The overall length L may mean a length in the longitudinal direction LD from a boundary point between the support leg 1221 or 1222 and the attachment foot 1230 to the end surface 1234 of the attachment portion 1300. The overall width W may mean a length of the end surface 1234 in the width direction. By way of example, a ratio of the overall width W to the overall length L of the attachment foot 1230 may be determined within the range of 1:1.5 to 1:1.8.

In the fishing line guide according to the embodiments, the attachment portion 1300 and the attachment foot 1230 of the frame 1200 are coupled to each other. The frame 1200 and the attachment portion 1300 may be coupled to each other by inserting the attachment foot 1230 into a portion of the attachment portion 1300 along the longitudinal direction of the rod body and then fitting and bonding a portion of the inserted attachment foot 1230 to the attachment portion 1300.

The attachment portion 1300 positions the frame 1200 supporting the guide ring 1100 with respect to the rod body of the fishing rod, and may be attached to the rod body through interference fit. FIGS. 12 to 15 show an example where the attachment portion of the fishing line guide according to one embodiment is attached to the rod body of the fishing rod.

Reference is made to FIGS. 3, 4, and 12 to 15. The attachment portion 1300 has an annular shape, and the rod body 111 can pass through the attachment portion 1300 in the longitudinal direction LD of the rod body. The attachment portion 1300 includes an annular body 1310 through which the rod body 111 can pass. The annular body 1310 may take a shape of a short pipe. An outer shape of the annular body 1310 may correspond to a cylindrical shape, but is not limited thereto. The annular body 1310 may take a shape of a polygonal cylinder. A through bore 1311, to which the rod body 111 is fitted in the longitudinal direction LD, is formed in the annular body 1310. The through bore 1311 is perforated through the annular body 1310 along a central axis of the annular body 1310. An outer peripheral surface of the rod body 111 and an inner peripheral surface of the through bore 1311 are coupled to each other through fitting. An inner diameter of the through bore 1311 may be uniform in the direction of the central axis AL of the rod body 111.

In the state where the rod body 111 passes through the through bore 1311, the attachment portion 1300 can be slid along the rod body 111 and be rotated with respect to the rod body 111. The rod body 111 has a tapering shape that tapers in the frontward direction TD. Thus, while the annular body 1310 is being moved in the rearward direction BD, the annular body 1310 can be fitted to the outer peripheral surface of the rod body 111 at a location where an outer diameter of the rod body 111 and an inner diameter of the through bore 1311 are approximately equal to each other. At this time, as the annular body 1310 is moved further in the rearward direction BD, the attachment portion 1300 can be fixed to the rod body 111 through interference fit.

The attachment portion 1300 is composed of a resin material, and can be manufactured from the resin material through injection molding. Since the attachment portion 1300 is fixed to the rod body through interference fit, a resin material having an excellent strength may be used as the material constituting the attachment portion. The main component of the resin material constituting the attachment portion may be engineering plastic. By way of example, the aforesaid plastic may be one of polyacetal (POM), polyamide (PA), polycarbonate (PC) and polybutylene terephthalate (PBT). Alternatively, the resin material may be fiber-reinforced engineering plastic which is reinforced by glass fiber or carbon fiber, and such a resin material can further improve a fixing force between the attachment portion and the rod body. Alternatively, since fiber-reinforced ABS resin among general purpose plastics has sufficient strength, the fiber-reinforced ABS resin may be used as a resin material for the attachment portion.

Figure 13:
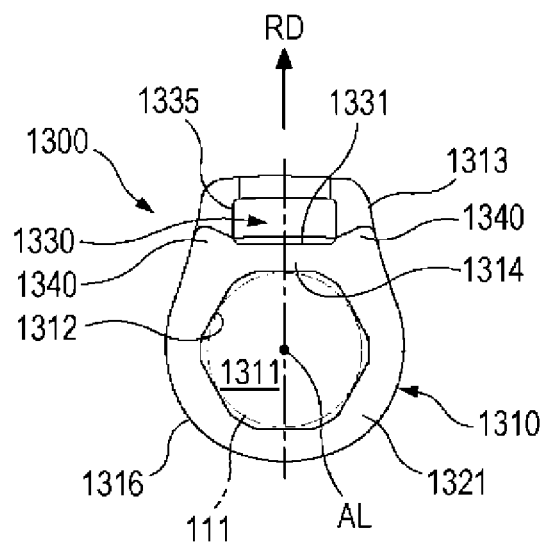
FIG. 13 is a front view showing the attachment portion of the fishing line guide according to one embodiment and the rod body of the fishing rod.
Figure 14:
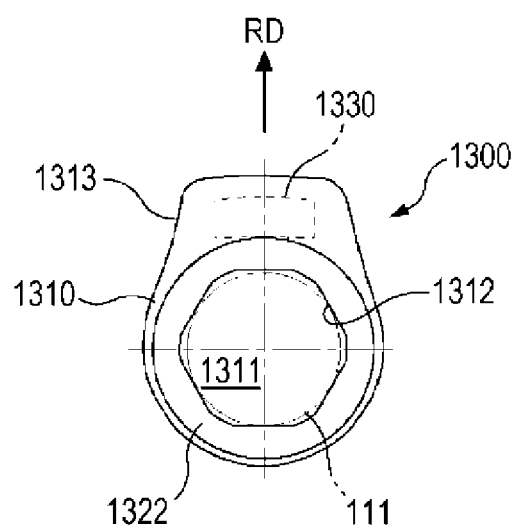
FIG. 14 is a rear view showing the attachment portion of the fishing line guide according to one embodiment and the rod body of the fishing rod.

The inner peripheral surface of the annular body 1310 (i.e., the inner surface of the annular body 1310 defining the through bore 1311) may include a plurality of flat surfaces 1312 that extend in the longitudinal direction. In one embodiment, the inner peripheral surface of the annular body 1310 includes six flat surfaces 1312. Therefore, the inner peripheral surface of the annular body 1310 may take an approximately hexagonal shape. A curved surface is formed between neighboring flat surfaces 1312. As shown in FIGS. 13 and 14, the aforesaid curved surface may form a clearance between the inner peripheral surface of the annular body 1310 and the outer peripheral surface of the rod body 111. As another embodiment, the entirety of the inner peripheral surface of the annular body 1310 may be formed as a cylindrical surface.

The attachment portion 1300 has a one end surface 1321 and an opposite end surface 1322 that are spaced apart from each other in the longitudinal direction. The one end surface 1321 is located at an end of the attachment portion 1300 in the frontward direction TD, and the opposite end surface 1322 is located at an end of the attachment portion 1300 in the rearward direction BD. The one end surface 1321 and the opposite end surface 1322 become the respective end surfaces of the annular body 1310. The one end surface 1321 and the opposite end surface 1322 may have an approximately annular shape.

The attachment portion 1300 includes a fitting hole 1330 for coupling the frame 1200 and the attachment portion 1300. The fitting hole 1330 is formed in the attachment portion 1300 along the longitudinal direction LD. The annular body 1310 has, at its top side, a coupling portion 1313 configured to form the fitting hole 1330. The coupling portion 1313 is formed to protrude upward from a cylindrical shape of the annular body 1310. Further, the coupling portion 1313 is formed at the top side of the annular body 1310 so as to cover the fitting hole 1330. Therefore, the annular body 1310 has a separation wall 1314 between the through bore 1311 and the fitting hole 1330. The separation wall 1314 constitutes a portion of the annular body 1310 in an upper region of the annular body 1310. The separation wall 1314 may define the fitting hole 1330 together with the coupling portion 1313.

The fitting hole 1330 is formed such that the attachment foot 1230 of the frame is inserted into and then fitted into the fitting hole 1330. Further, the fitting hole 1330 accommodates an adhesive agent 1400 for bonding the attachment foot 1230 and the attachment portion 1300.

The fitting hole 1330 is formed in the annular body 1310 so as to be spaced apart from the one end surface 1321 of the attachment portion (i.e., a front end surface of the annular body 1310) along the longitudinal direction LD. An entrance 1335 of the fitting hole 1330 is spaced apart from the one end surface 1321 of the attachment portion in the rearward direction BD along the longitudinal direction LD, and the fitting hole 1330 extends from the entrance 1335 in the rearward direction BD in parallel with the central axis AL of the rod body. Further, the fitting hole 1330 is separated from the through bore 1311 in a radial direction RD of the central axis AL, and is formed at the outside of the through bore 1311. The separation wall 1314 of the annular body 1310 separates the fitting hole 1330 from the through bore 1311 in the radial direction RD.

Figure 12:
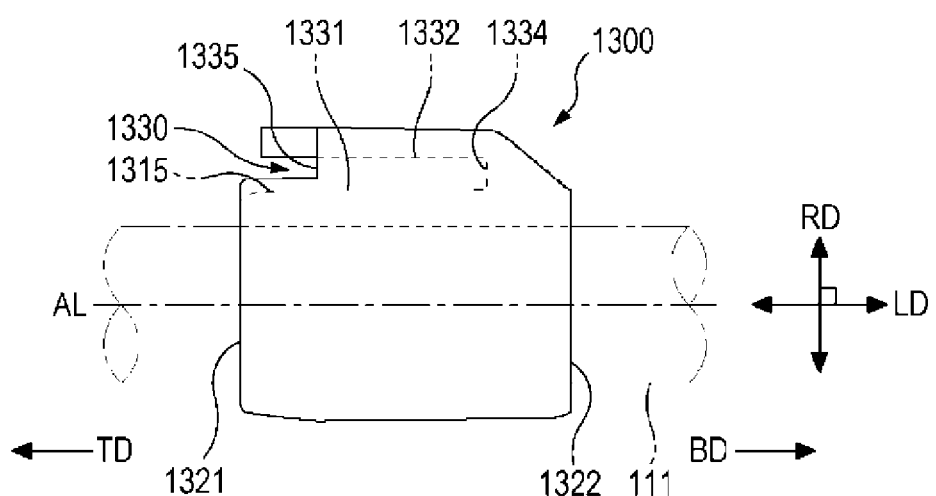
FIG. 12 is a side view showing the attachment portion of the fishing line guide according to one embodiment and the rod body of the fishing rod.
Figure 15:
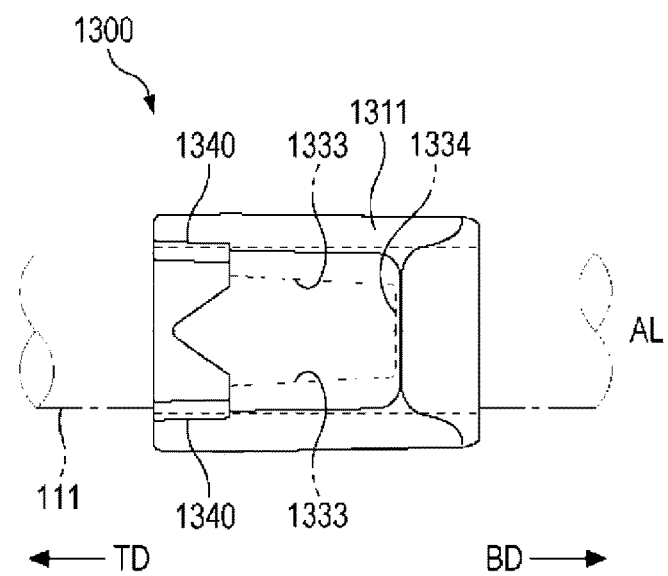
FIG. 15 is a plan view showing the attachment portion of the fishing line guide according to one embodiment and the rod body of the fishing rod.

As shown in FIGS. 12 and 15, the fitting hole 1330 may have a bottom surface 1331, a top surface 1332, a pair of lateral surfaces 1333 extending along the longitudinal direction LD between the bottom surface 1331 and the top surface 1332, and a closed surface 1334 forming a closed end of the fitting hole 1330. The bottom surface 1331, the top surface 1332, the pair of lateral surfaces 1333, and the closed surface 1334 define the fitting hole 1330 to which the attachment foot 1230 is fitted, and in which the adhesive agent is filled. A cross-sectional shape of the fitting hole 1330 may be a rectangular shape or a quadrilateral shape curved with a certain curvature.

The bottom surface 1331 corresponds to the lower surface 1231 of the attachment foot (see FIG. 10). The bottom surface 1331 becomes a portion of an upper surface of the separation wall 1314. The top surface 1332 is located opposite the bottom surface 1331 in the radial direction RD. A spacing between the pair of lateral surfaces 1333 becomes gradually narrow in the rearward direction BD so as to correspond to a spacing between the lateral surfaces of the attachment foot (see FIG. 15). The pair of lateral surfaces 1333 are formed as an approximately flat surface. Therefore, if the attachment foot 1230 is inserted into the fitting hole 1330, a space 1411 can be formed between the lateral surfaces 1233 of the attachment foot and the lateral surfaces 1333 of the fitting hole 1330 (see FIG. 7). The space 1411 may be a space where the adhesive agent is hardened between the attachment foot and the fitting hole.

As shown in FIGS. 4, 7 and 12, the bottom surface of the fitting hole 1330 is a portion of the upper surface 1315 of the separation wall 1314. That is, the bottom surface 1331 is a portion of the flat upper surface 1315 which extends from the one end surface 1321 of the attachment portion 1300 along the longitudinal direction LD in the rearward direction BD. Since the fitting hole 1330 is spaced apart from the one end surface 1321, front ends of the top surface 1332 and the lateral surface 1333 are spaced apart from the one end surface 1321 in the rearward direction BD, and lengths of the top surface 1332 and the lateral surface 1333 in the longitudinal direction LD are shorter than a length of the upper surface 1315 of the separation wall in the longitudinal direction LD.

Figure 16:
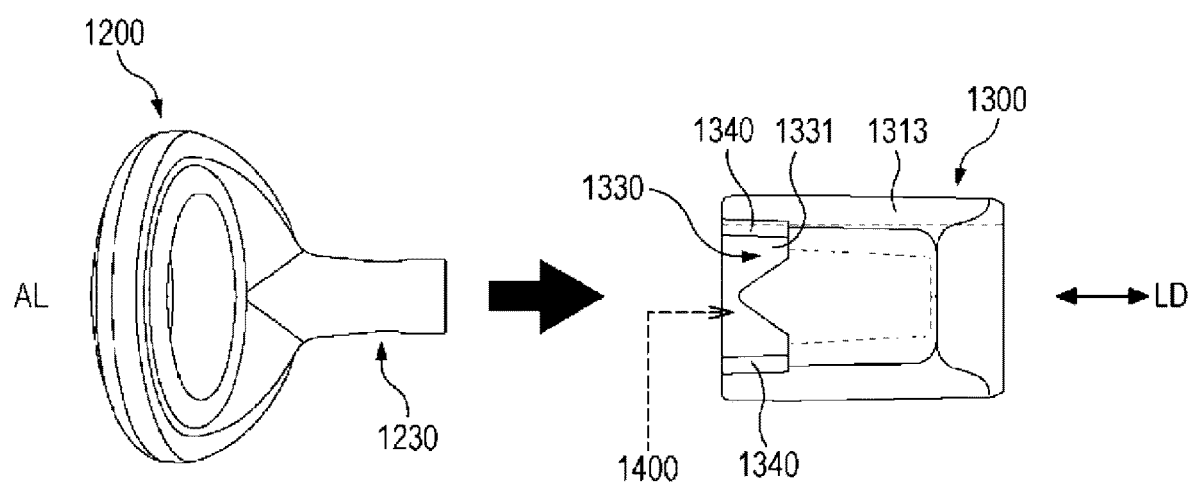
FIG. 16 is a plan view showing an example where the frame and the attachment portion of the fishing line guide according to one embodiment are coupled to each other.
Figure 17:
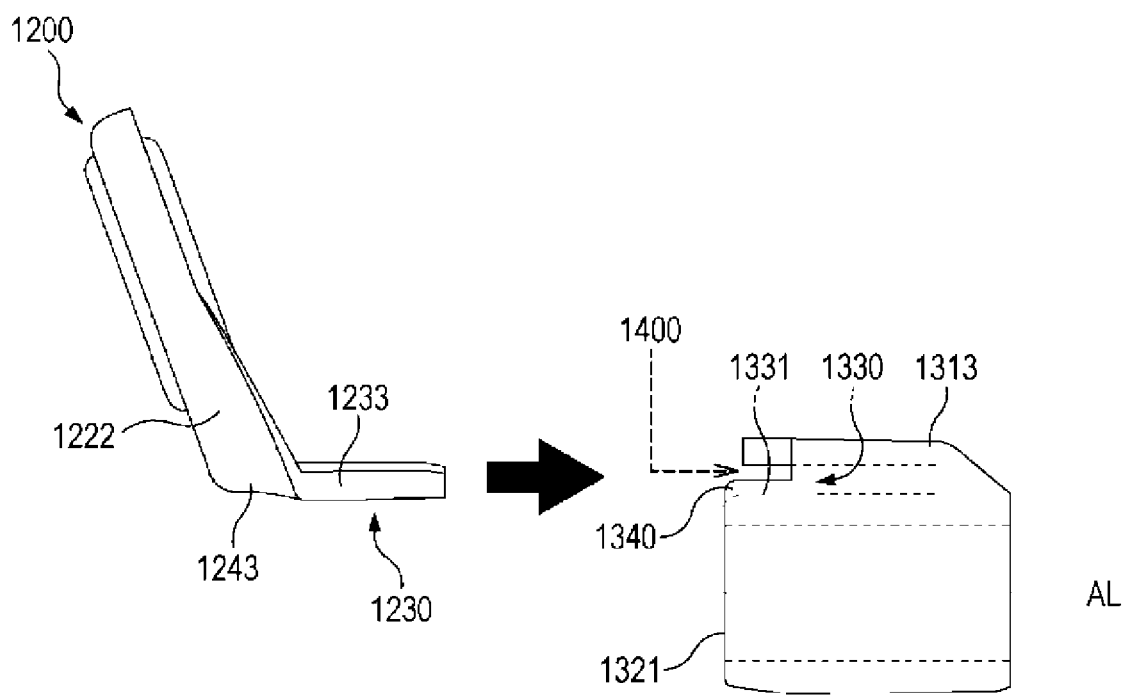
FIG. 17 is a side view showing an example where the frame and the attachment portion of the fishing line guide according to one embodiment are coupled to each other.
Figure 18:
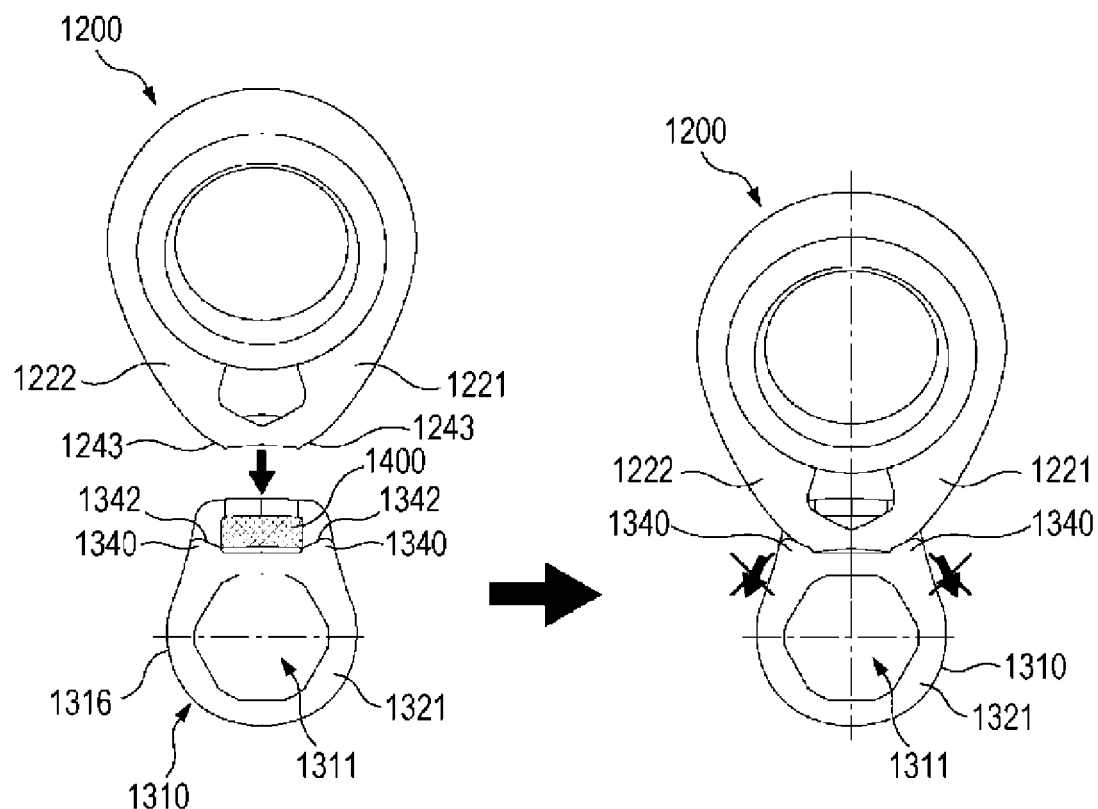
FIG. 18 is a front view showing an example where the frame and the attachment portion of the fishing line guide according to one embodiment are coupled to each other.

The coupling between the frame and the attachment portion is described with reference to FIGS. 4 and 16 to 18. FIGS. 16 to 18 show an example where the frame and the attachment portion of the fishing line guide according to one embodiment are coupled to each other.

To firmly couple the attachment foot 1230 to the attachment portion 1300, the adhesive agent 1400 fills in or is applied to the fitting hole 1330. The attachment foot 1230 is inserted and fitted into the fitting hole 1330, and is bonded to the attachment portion 1300 by the adhesive agent 1400 between the coupling portion 1313 and the separation wall 1314. Epoxy resin may be used as the adhesive agent 1400. Alternatively, urethane resin, acrylic resin, acrylic modified silicone resin, or cyanoacrylate may be used as the adhesive agent 1400.

In one embodiment, the attachment portion of the fishing line guide improves the coupling strength between the attachment foot and the attachment portion, by preventing the adhesive agent from leaking out from the fitting hole through the support leg of the frame when the attachment foot is inserted into the fitting hole. Referring to FIG. 4, to prevent the adhesive agent from leaking out, the attachment portion 1300 includes a pair of ridges 1340 which are located adjacent to the entrance 1335 of the fitting hole 1330 and extend in the insertion direction of the attachment foot 1230.

The pair of ridges 1340 are disposed between the one end surface 1321 of the attachment foot and the fitting hole 1330, and are spaced apart from each other in the width direction WD. The pair of ridges 1340 extend from the one end surface 1321 of the attachment portion along the longitudinal direction LD. Therefore, a portion of the upper surface 1315 of the separation wall 1314 is located between the pair of ridges 1340. Each of the ridges 1340 protrudes from an outer peripheral surface 1316 of the annular body 1310 (i.e., an outer peripheral surface of the attachment portion) outwardly in the radial direction RD. Each of the ridges 1340 is configured to contact the lateral surface 1243 of the frame 1200 adjacent to the attachment foot 1230 when the attachment foot is inserted and fitted into the fitting hole (see FIG. 5). Each of the ridges 1340 protrudes in a convex shape so as to be higher than the upper surface 1315 of the separation wall or the bottom surface 1331 of the fitting hole, and can function as a kind of an embankment. Each of the ridges 1340 has a front end surface 1341 forming an end surface in the frontward direction TD, an inward surface 1342 facing inward in the width direction WD, and an outward surface 1343 located opposite the inward surface 1342 in the width direction WD.

The front end surface 1341 of the ridge may form the same surface together with the one end surface 1321 of the attachment portion. Alternatively, the front end surface 1341 of the ridge may be spaced apart from the one end surface 1321. A rear end of the ridge 1340 connects with a front end of the coupling portion 1313 that defines the entrance 1335 of the fitting hole 1330. Therefore, the front end of the coupling portion 1313 is spaced apart from the one end surface 1321 in the rearward direction BD by a length of the ridge 1340.

Figure 5:
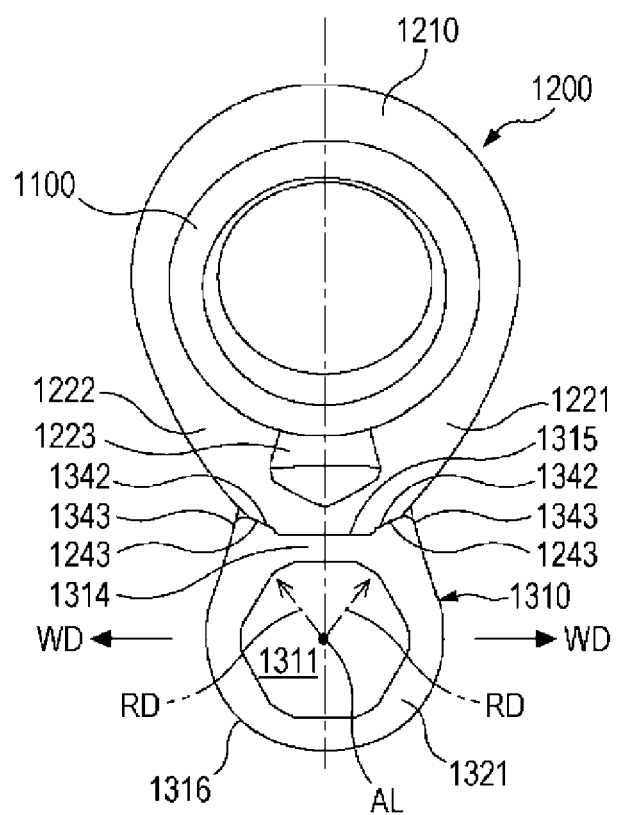
FIG. 5 is a front view of the fishing line guide shown in FIG. 2.
Figure 6:
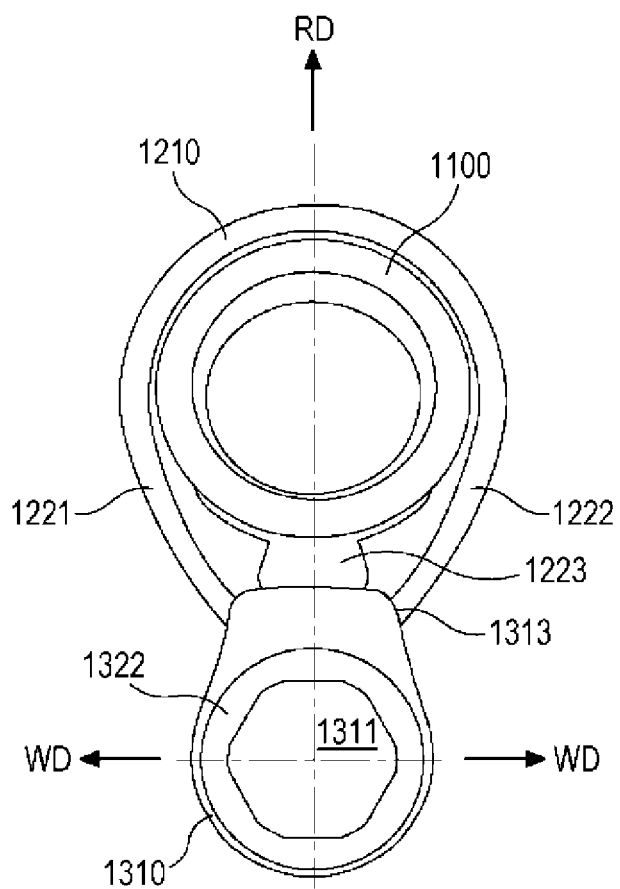
FIG. 6 is a rear view of the fishing line guide shown in FIG. 2.

The inward surface 1342 adjoins the upper surface 1315 of the separation wall in the width direction WD, and extends along the upper surface 1315. The inward surface 1342 connects with the upper surface 1315 of the separation wall. The ridge 1340 contacts the lateral surface 1243 of the support leg 1220 of the frame in the width direction WD at the inward surface 1342 of the ridge. The ridge 1340 is formed so as to be in contact with the lateral surface 1243 of the frame 1200 adjacent to the lateral surface of the attachment foot 1230 in the width direction WD when the attachment foot 1230 is coupled to the fitting hole 1330, as shown in FIG. 5. Referring to FIG. 17, the aforesaid lateral surface 1243 of the frame is a portion of an outer peripheral surface of the frame and is located in the vicinity of a lower end of the frame. In this embodiment, the lateral surface 1243 of the frame is a portion of an outer peripheral surface of each of the support legs 1221 and 1222, and is located in front of the attachment foot 1230 in the vicinity of the lower end of each of the support legs 1221 and 1222.

The outward surface 1343 is located further outward than the lateral surface 1243 of the frame in the width direction WD, and is located in the vicinity of the one end surface 1321 of the attachment portion 1300 between the lateral surface 1243 of the frame and the outer peripheral surface 1316 of the attachment portion (i.e., the outer peripheral surface of the annular body). The outward surface 1343 may include a flat surface or a curved surface. The ridge 1340 protrudes in the annular body 1310 such that the outward surface 1343 is connected to the outer peripheral surface of the attachment portion. Therefore, the outward surface 1343 forms a portion of the outer peripheral surface 1316 of the attachment portion 1300 (a portion of the outer peripheral surface of the annular body 1310). The ridge 1340 is configured such that the inward surface of the ridge 1340 contacts with the lateral surface of the frame 1200 and the outward surface of the ridge forms a portion of the outer peripheral surface of the attachment portion. Accordingly, the ridge 1340 is positioned in the vicinity of the one end surface 1321 of the attachment portion at a boundary between the lateral surface of the frame and the outer peripheral surface of the attachment portion, and therefore occupies a gap between the lateral surface of the frame and the outer peripheral surface of the attachment portion. That is, the ridge 1340 excludes a concave portion like a valley shape between the lateral surface of the frame and the outer peripheral surface of the attachment portion.

If the attachment foot 1230 is inserted into the fitting hole 1330, the lateral surface 1243 of the frame 1200 adjacent to the attachment foot 1230 is brought into contact with the inward surface 1342 of the ridge 1340. Further, the ridge 1340 protrudes from the upper surface 1315 of the separation wall by a predetermined height. Accordingly, as shown in FIG. 18, the ridges 1340 can prevent the adhesive agent 1400 from leaking out from the fitting hole through the outer peripheral surfaces of the support legs 1221 and 1222, i.e., through the lateral surfaces 1243 of the frame. Further, the ridges 1340 can prevent the adhesive agent 1400 from overflowing to the outer peripheral surface of the annular body 1310. As described above, since the pair of ridges 1340 can retain the adhesive agent 1400 between the attachment foot and the fitting hole, the coupling strength between the attachment foot and the attachment portion can be enhanced.

Figure 19:
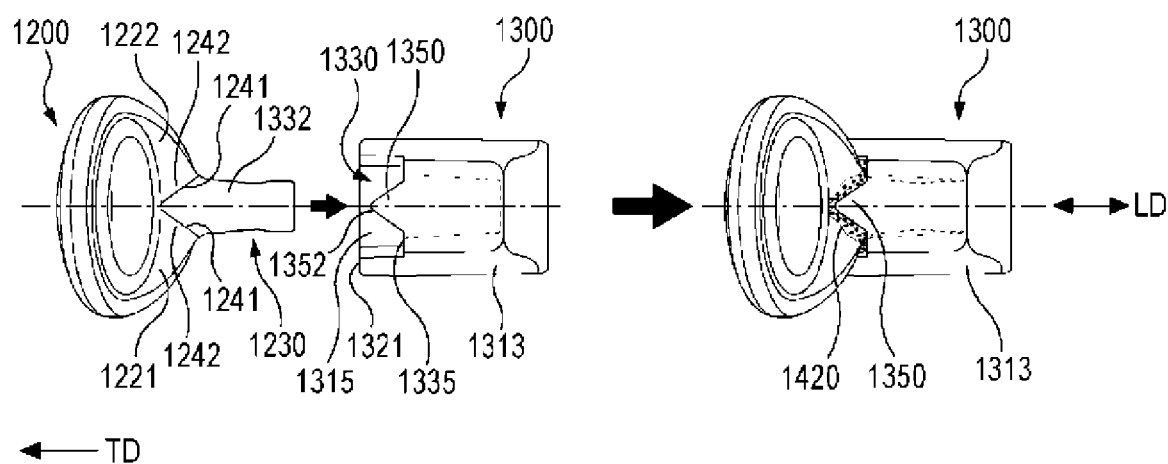
FIG. 19 is a plan view showing an example where the frame and the attachment portion of the fishing line guide according to one embodiment are coupled to each other and a portion of an adhesive agent is disposed between the frame and the attachment portion.
Figure 20:
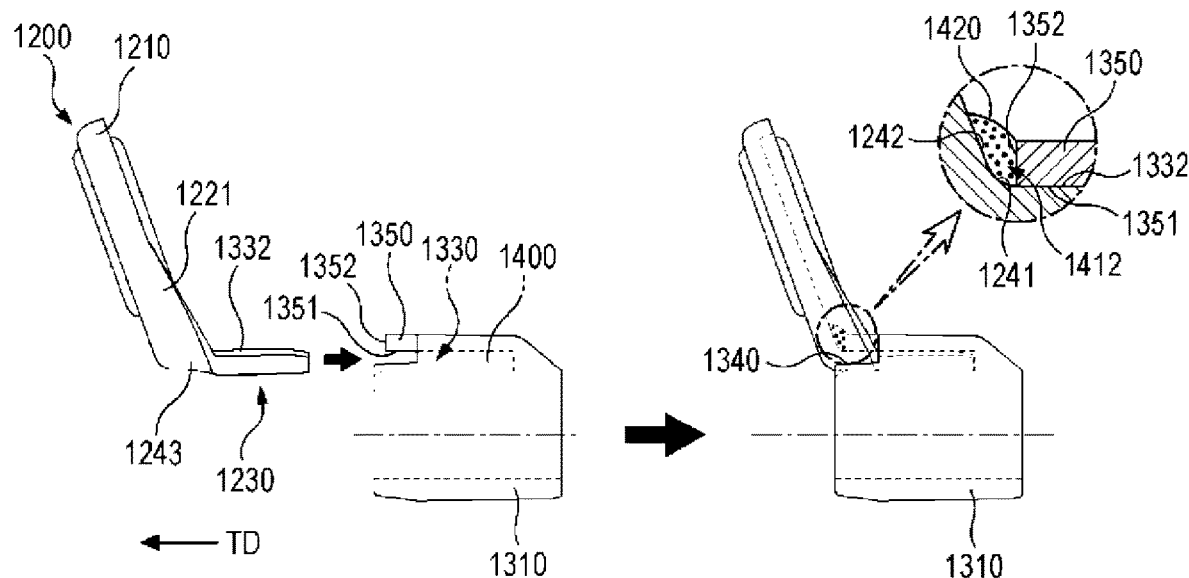
FIG. 20 is a side view showing an example where the frame and the attachment portion of the fishing line guide according to one embodiment are coupled to each other and a portion of an adhesive agent is disposed between the frame and the attachment portion.
Figure 21:
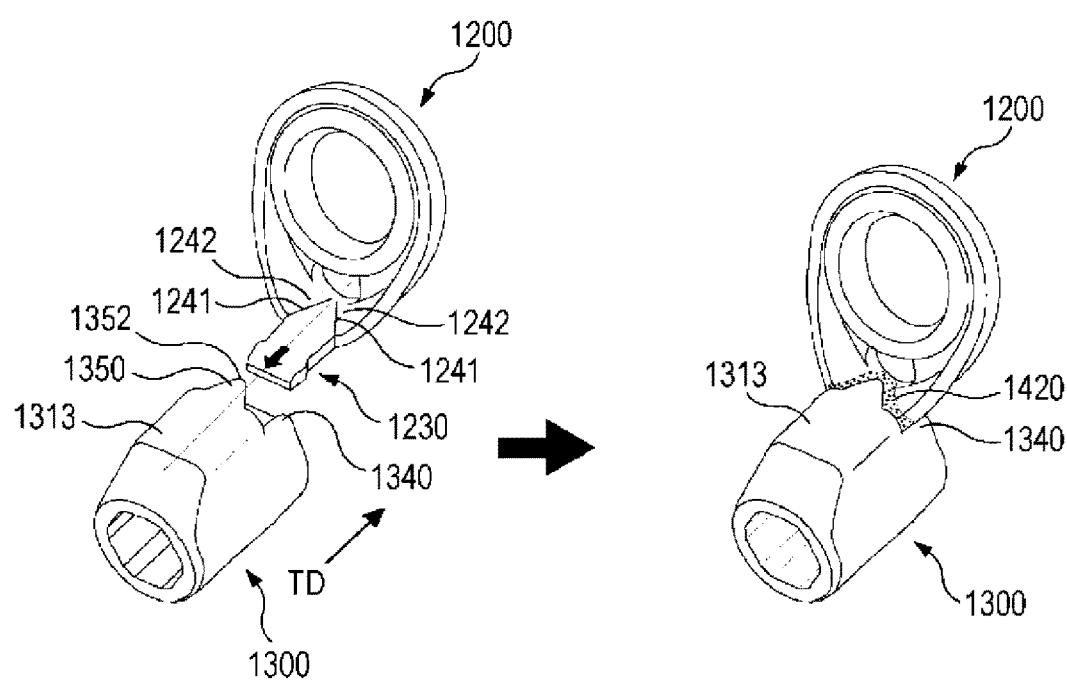
FIG. 21 is a rear perspective view showing an example where the frame and the attachment portion of the fishing line guide according to one embodiment are coupled to each other and a portion of an adhesive agent is disposed between the frame and the attachment portion.

The fishing line guide according to one embodiment is configured such that a portion of the attachment portion matches with the support leg of the frame in shape and a portion of the adhesive agent is disposed at such a shape-matching portion. Accordingly, the fishing line guide according to one embodiment can have a strong coupling force and a strong coupling strength between the frame and the attachment portion. In this regard, reference is made to FIGS. 3, 4, and 19 to 21. FIGS. 19 to 21 show that the frame and the attachment portion of the fishing line guide according to one embodiment are coupled to each other and a portion of the adhesive agent is in close contact with the frame.

The frame 1200 may have a surface 1242 located opposite the entrance 1335 of the fitting hole 1330 along the longitudinal direction LD. The aforesaid surface 1242 can be bonded to a portion of the attachment portion 1300 by a portion of the adhesive agent. Hereinafter, the aforesaid surface 1242 is referred to as a bonding surface. In one embodiment, the frame 1200 has, on its rearward surface, the bonding surface 1242 including the above-described concave portion 1241. The bonding surface 1242 is a surface extending in the rearward surface of the frame 1200 along the boundary between the support legs 1221 and 1222 and the attachment foot 1230 and having a predetermined width. Thus, the concave portion 1241 can be included in the bonding surface 1242.

The attachment portion 1300 may include a pressing portion 1350 which is located above the fitting hole 1330 and protrudes toward the frame 1200 along the longitudinal direction LD. The pressing portion 1350 protrudes from the front end of the coupling portion 1313 of the annular body 1310, and has a thickness corresponding to a thickness of the coupling portion 1313. That is, the pressing portion 1350 is located immediately above the entrance of the fitting hole 1330, and, at its lower surface 1351, defines the entrance 1335 together with the upper surface 1315 of the separation wall.

The entrance 1335 of the fitting hole 1330 is spaced apart from the one end surface 1321 in the rearward direction, and the top surface of the fitting hole 1330 is spaced apart from the bottom surface in the radial direction. The pressing portion 1350 protrudes from the entrance 1335 in the frontward direction TD in the state where the pressing portion 1350 is spaced part from the upper surface 1315 of the separation wall in the radial direction. Accordingly, the pressing portion 1350 is configured to cover a portion of the upper surface 1232 of the attachment foot 1230 which is not inserted into the fitting hole 1330 but is exposed from the fitting hole 1330. The pressing portion 1350 may be provided in the attachment portion 1300 such that the top surface of the fitting hole 1330 forms the same surface as the lower surface 1351 of the pressing portion 1350. As another example, a stepped surface may be provided between the lower surface 1351 of the pressing portion 1350 and the top surface of the fitting hole 1330.

The pressing portion 1350 may have a triangular shape convex in the frontward direction TD. Therefore, the pressing portion 1350 has a protruding end 1352 having a V shape. The protruding end 1352 is spaced from the one end surface 1321 of the attachment portion in the rearward direction. If the attachment foot is inserted into the fitting hole, the protruding end 1352 is spaced apart from the surface of the frame 1200 that is located opposite the pressing portion 1350 in the longitudinal direction. The aforesaid surface of the frame 1200, which is located opposite the protruding end 1352, is the above-described bonding surface 1242. Therefore, the protruding end 1352 defines an adhesive space 1412 (see FIGS. 7 and 20) between the pressing portion 1350 and the aforesaid surface of the frame 1200 located opposite the pressing portion 1350 along the longitudinal direction (i.e., the bonding surface 1242). A portion of the adhesive agent accommodated in the fitting hole 1330 is disposed in the adhesive space 1412.

In one embodiment, the pressing portion 1350 is configured such that the protruding end 1352 is located adjacent to the boundary between the support legs 1221 and 1222 and the attachment foot 1230. Further, the frame 1200 has the above-described concave portion 1241 in the bonding surface 1242 located opposite the pressing portion 1350. The concave portion 1241 has a V shape convex toward in the frontward direction TD, and is formed so as to have a shape complementary to the protruding end 1352. If the attachment foot 1230 is inserted into the fitting hole 1330, the concave portion 1241 is positioned so as to match the protruding end 1352. Thus, the protruding end 1352 can function as a male-type shape-matching portion, and the concave portion 1241 of the frame can function as a female-type shape-matching portion. The protruding end 1352 includes a vertical surface, and is spaced apart from the bonding surface 1242 of the frame. Therefore, if the attachment foot 1230 is inserted into the fitting hole 1330, the adhesive space 1412, in which a portion of the adhesive agent can be disposed, is formed between the bonding surface 1242 including the concave portion 1241 and the protruding end 1352 of the pressing portion 1350. Such an adhesive space 1412 may be formed in a V shape along the protruding end 1352 and the concave portion 1241.

As the attachment foot 1230 is inserted into the fitting hole 1330, a portion of the adhesive agent 1400 in the fitting hole 1330 can be pushed out in the frontward direction TD through gaps between the fitting hole 1330 and the attachment foot 1230. The pushed adhesive agent 1400 enters the adhesive space 1412 located between the protruding end 1352 of the pressing portion and the bonding surface 1242 of the frame, and then can be hardened in the adhesive space 1412. Therefore, as shown in FIGS. 19 to 21, the protruding end 1352 of the pressing portion 1350 guides the portion 1420 of the adhesive agent to a portion of the rearward surface of the frame 1200 (i.e., the bonding surface 1242), and brings the portion 1420 of the adhesive agent into close contact with the bonding surface 1242. By the portion 1420 of the adhesive agent guided to the adhesive space 1412, the protruding end 1352 and the concave portion 1241 can be bonded to each other at the adhesive space 1412. Thus, in addition to the bonding of the attachment foot 1230 and the fitting hole 1330, both a portion of the rearward surface of the frame 1200 (specifically, the surface including the boundary between each of the support legs 1221 and 1222 and the attachment foot 1230) and the pressing portion 1350 can be bonded to each other. Therefore, the bonding structure between the attachment portion 1300 and the attachment foot 1230 of the frame 1200 as well as the bonding structure between the attachment portion 1300 and the support leg of the frame can be realized. In this regard, when the attachment foot 1230 is inserted into the fitting hole 1330, the ridges 1340 can smoothly guide the portion of the adhesive agent 1400 to the adhesive space 1412 while preventing the adhesive agent 1400 from leaking toward the outer surfaces of the support legs 1221 and 1222. Further, by the adhesive agent 1400, the lower surface of the pressing portion 1350 can be bonded to the upper surface of the attachment foot 1230 exposed from the fitting hole 1330.

As shown in FIG. 1, the fishing line guide according to one embodiment may be attached to the rod body 111 disposed at the tip side of the fishing rod. The rod body 111 disposed at the tip side of the fishing rod tends to swing considerably during fishing. Therefore, a line tangle tends to occur since the fishing line is wound around the fishing line guide attached to the rod body 111 during fishing. In addition, since the rod body 111 is located far from the rod body 114 (the base rod) gripped by the user, the fishing line guide attached to the rod body 111 is out of reach of the user's hand. Accordingly, it is important that the fishing line guide attached to the rod body 111 is configured so as to make it difficult for a line tangle to occur, and further is configured to easily untangle the line tangle. In the fishing line guide according to one embodiment, the attachment portion 1300 includes the pair of ridges 1340. Therefore, the ridges 1340 can prevent the fishing line from being tangled with the fishing line guide and can permit a smooth movement of the fishing line even though a line tangle is just about to occur.

Figure 22:
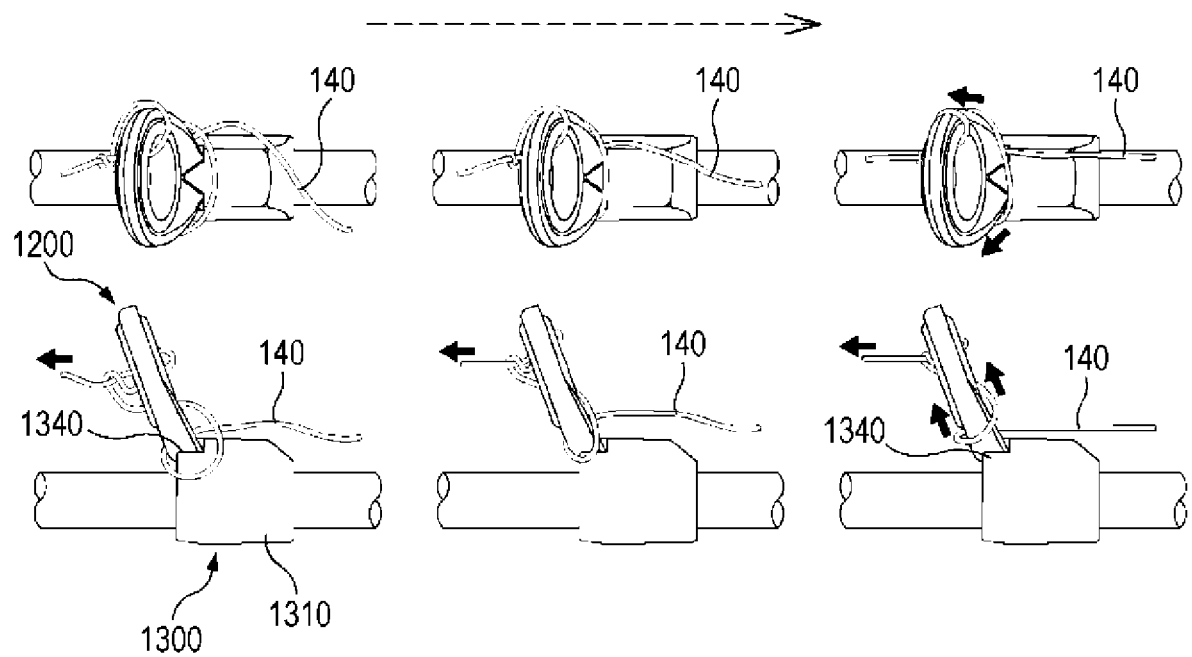
FIG. 22 illustrates that a line tangle of a fishing line does not occur in the fishing line guide according to one embodiment.
Figure 23:
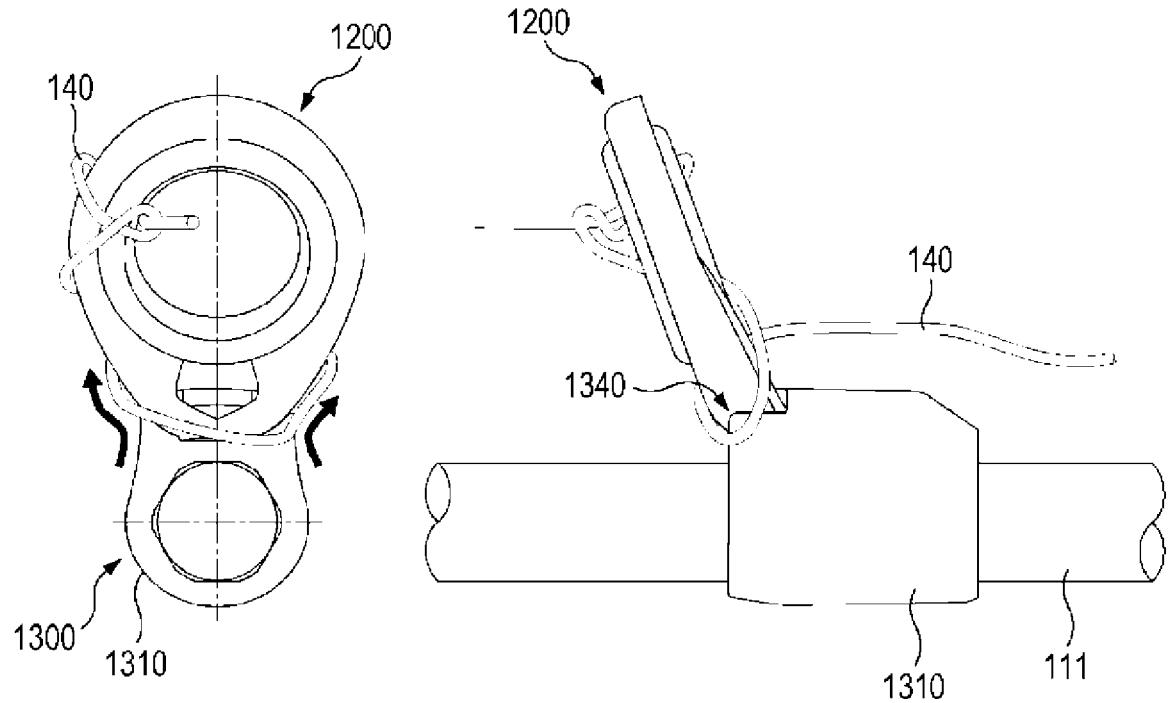
FIG. 23 illustrates in detail that a line tangle of a fishing line does not occur in the fishing line guide according to one embodiment shown in FIG. 22.

FIGS. 22 and 23 illustrate that a line tangle of the fishing line does not occur in the fishing line guide according to one embodiment. Solid arrows shown in FIGS. 22 and 23 indicate a movement of the fishing line 140 during fishing. As shown in FIGS. 22 and 23, the pair of ridges 1340 having a convex shape can prevent the fishing line 140 from being wound around the frame 1200. Further, although the fishing line 140 is tangled with the frame 1200, the pair of ridges 1340 can permit the smooth movement of the fishing line without the line tangle. In the fishing line guide according to one embodiment, the pair of ridges 1340 exist between the outer peripheral surface of the attachment portion 1300 and the lateral surface of the frame 1200. Therefore, as shown in FIG. 23, a valley-shaped concave portion is not formed between the outer peripheral surface of the attachment portion 1300 (the outer peripheral surface of the annular body 1310) and the lateral surface of the frame 1200. Since the fishing line 140 can move between the attachment portion 1300 and the frame 1200 without being wound around the frame 1200, the line tangle of the fishing line 140 can be prevented. Further, even when the fishing line 140 is likely to become tangled such as the fishing line being wound between the frame 1200 and the attachment portion 1300, the line tangle can be easily untangled by the pair of ridges 1340.

Figure 24:
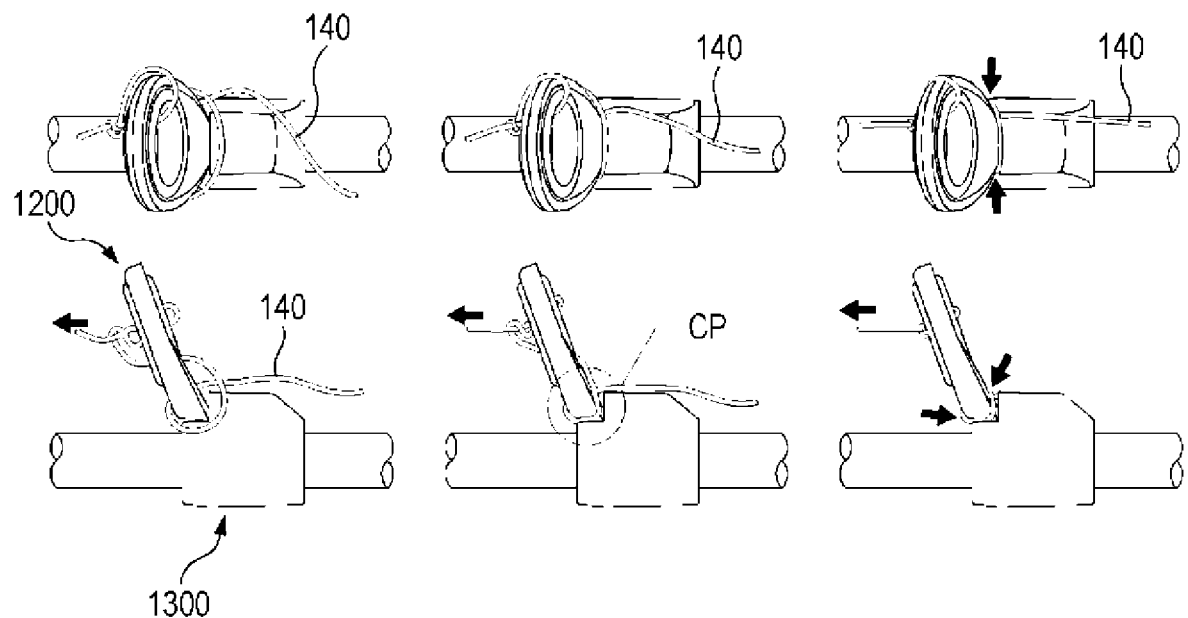
FIG. 24 illustrates that a line tangle occurs and the line tangle is not untangled in a fishing line guide according to a comparative example which does not have a ridge of one embodiment.
Figure 25:
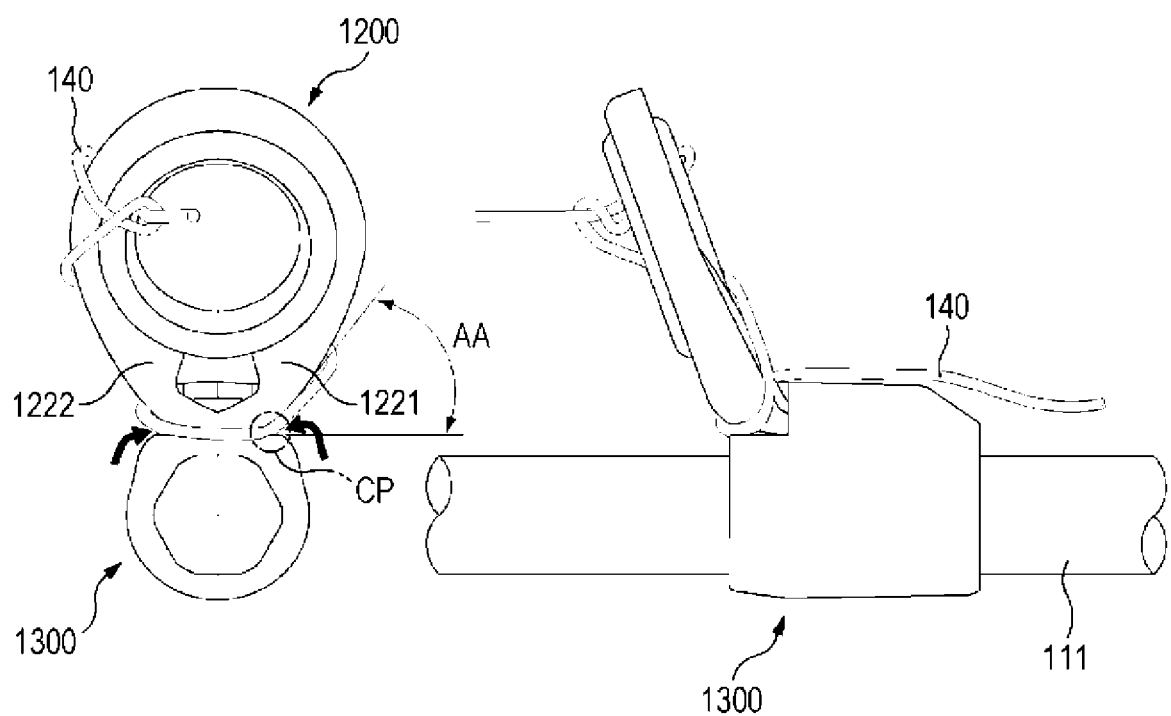
FIG. 25 illustrates in detail that a line tangle occurs and the line tangle is not untangled in the comparative example shown in FIG. 24.

FIGS. 24 and 25 show an example where a line tangle occurs and the line tangle cannot be untangled in a fishing line guide according to a comparative example which does not have the ridges according to one embodiment. Referring to FIGS. 24 and 25, the fishing line guide according to the comparative example does not include the above-described ridges between the outer peripheral surface of the attachment portion 1300 and the lateral surface of the frame 1200. Therefore, as shown by reference symbol CP in FIG. 24, the fishing line 140 is caught between the outer peripheral surface of the attachment portion 1300 and the lateral surface of the frame 1200. The fishing line 140 caught between the frame 1200 and the attachment portion 1300 is tightly wound around the frame 1200 and causes the line to tangle. The line tangle cannot be untangled in the movement process of the fishing line 140. Referring to FIG. 25, in the fishing line guide according to the comparative example, valley-shaped concave portions CP, which have an acute angle AA and in which the fishing line 140 can be caught, are formed between the lateral surfaces of the frame 1200 (the outer surfaces of the support legs 1221 and 1222) and the outer peripheral surface of the attachment portion 1300. Due to the concave portions CP, the fishing line 140 is easily caught between the frame 1200 and the attachment portion 1300 to cause the line to tangle. Further, the line tangle cannot be easily untangled during the movement of the fishing line 140.

In the fishing line guide according to one embodiment, the attachment portion 1300 includes the pressing portion 1350 that is inserted between the support leg of the frame 1200 and the attachment foot. The pressing portion 1350 can prevent the fishing line from being tangled with the fishing line guide. The pressing portion 1350 can allow the fishing line to smoothly move without the line tangle even when the line tangle is about to occur.

Figure 26:
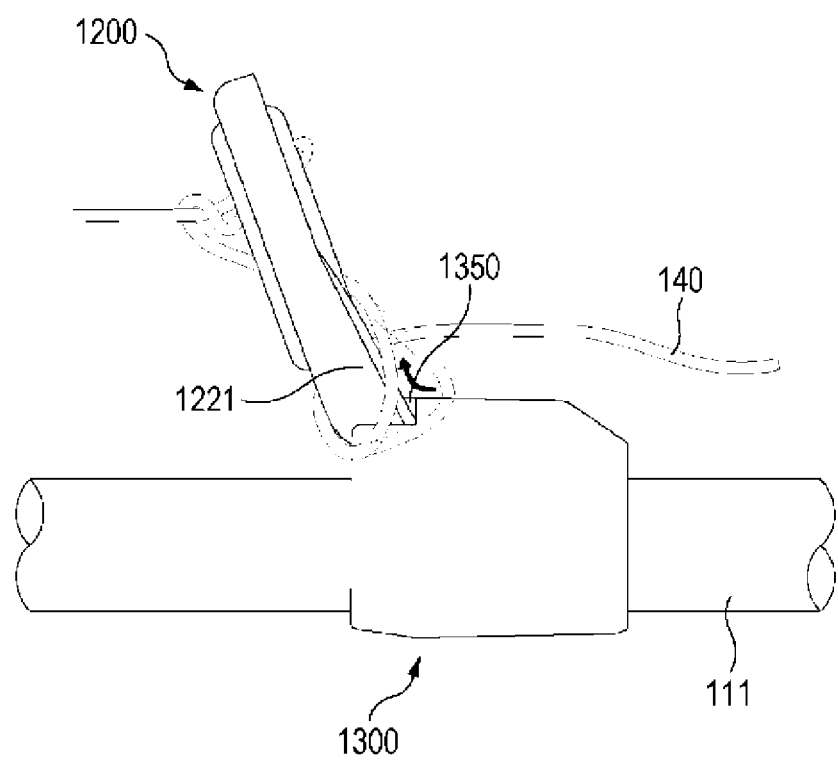
FIG. 26 shows another example where a line tangle does not occur in the fishing line guide according to one embodiment.

FIG. 26 shows another example where a line tangle does not occur in the fishing line guide according to one embodiment. As shown in FIG. 26, the pressing portion 1350 protrudes toward the frame 1200 at the top side of the attachment portion 1300. The pressing portion 1350 excludes the valley-shaped concave portion, at which the fishing line 140 can be caught, between the support legs 1221 and 1222 and the entrance of the fitting hole. Therefore, the pressing portion 1350 prevents the line tangle which is made by the fishing line 140 due to the fishing line being tangled by being wound around the frame 1200. Further, in the event of a line tangle, the line tangle can be easily untangled. The fishing line 140 can move from the attachment portion 1300 through the pressing portion 1350 toward the frame 1200 without being wound around the frame 1200, and the line tangle can be smoothly untangled.

Figure 27:
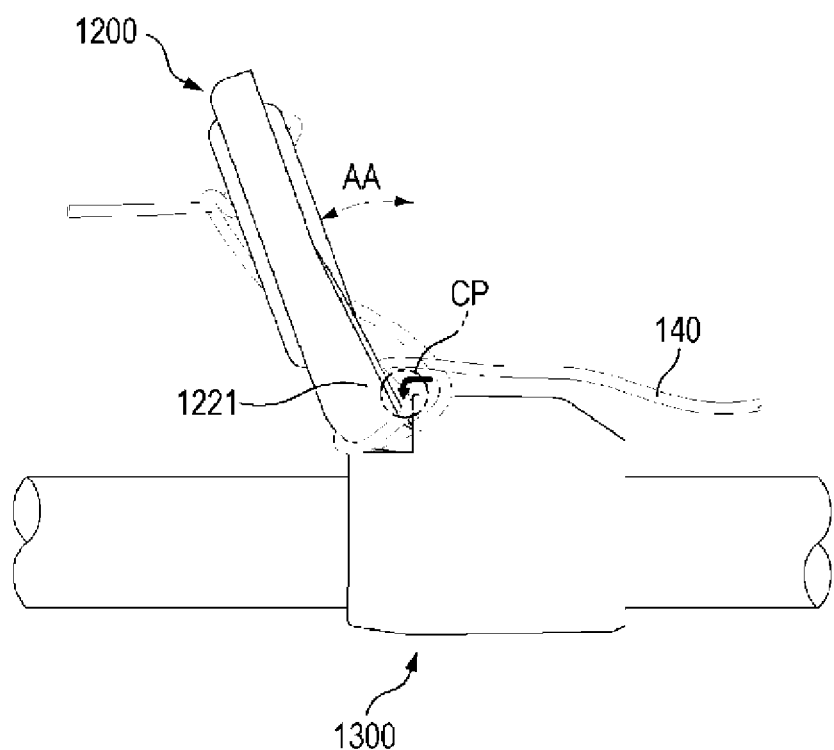
FIG. 27 illustrates that a line tangle occurs and the line tangle is not untangled in a fishing line guide according to a comparative example which does not have a pressing portion of one embodiment.

FIG. 27 shows that a line tangle occurs in a fishing line guide according to a comparative example and the line tangle cannot be untangled. Referring to FIG. 27, the fishing line guide according to the comparative example has, between the support legs 1221 and 1222 and the entrance of the fitting hole, the valley-shaped concave portion CP having an acute angle AA, and the fishing line 140 can be caught at the concave portion CP. The fishing line 140 caught at the concave portion CP fails to move from the attachment portion 1300 toward the frame 1200, and causes the line tangle.

Figure 28:
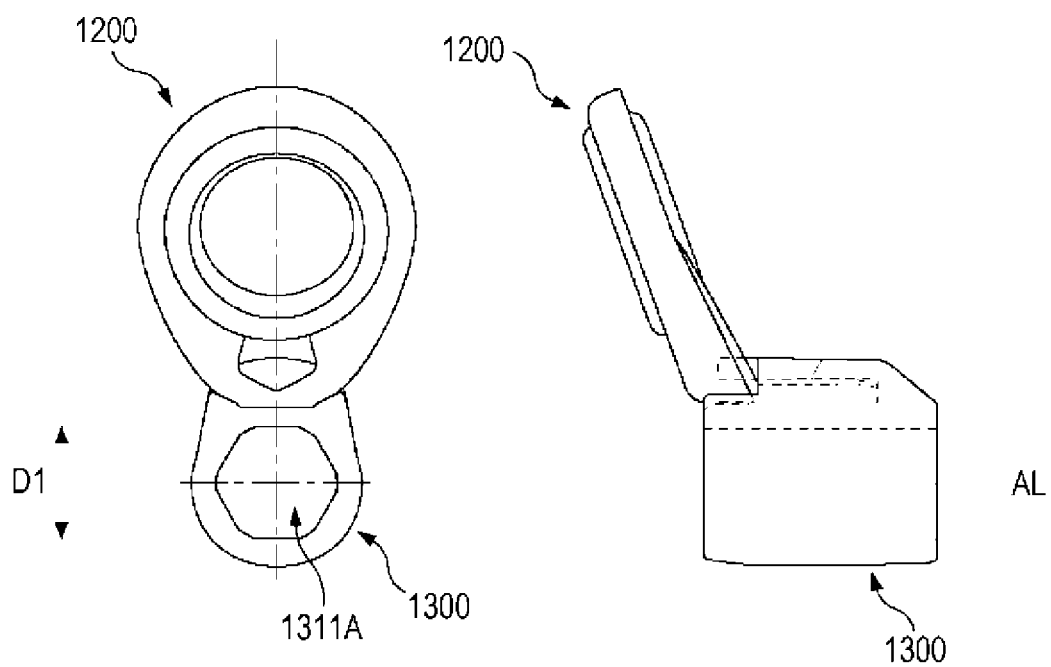
FIG. 28 shows a fishing line guide according to one embodiment in which a frame is coupled to a relatively small attachment portion.
Figure 29:
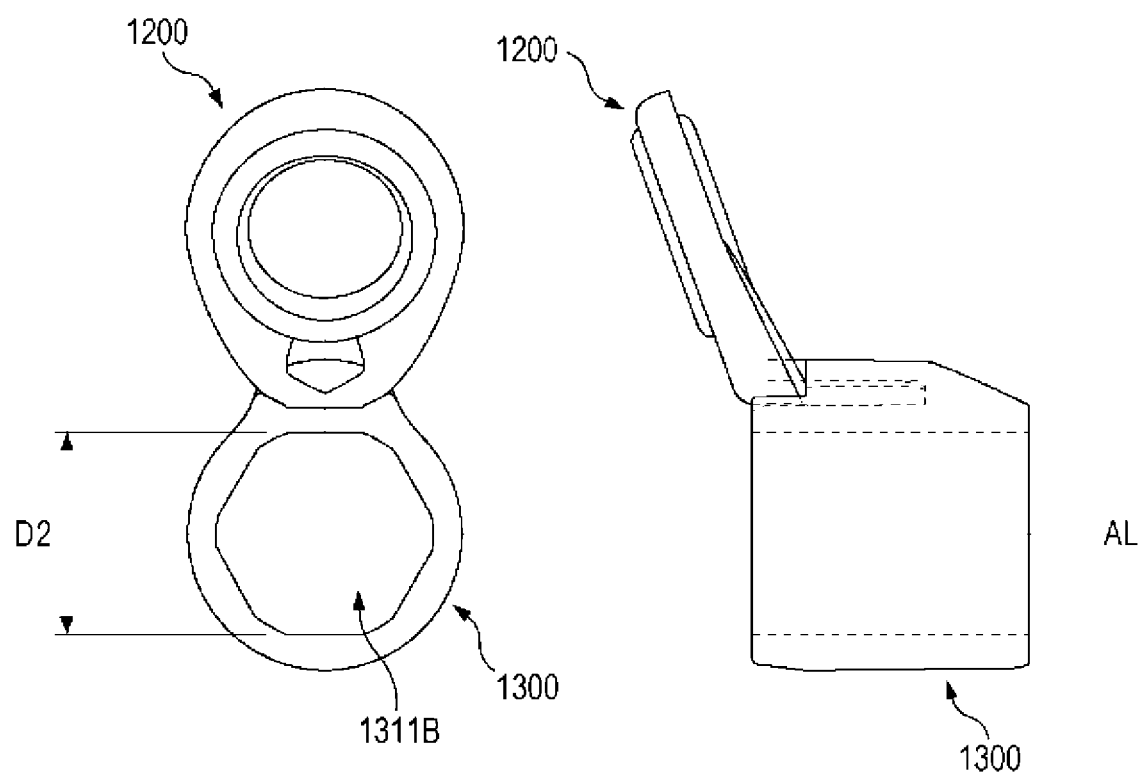
FIG. 29 shows a fishing line guide according to one embodiment in which a frame is coupled to a relatively large attachment portion.

In the fishing line guide according to one embodiment, the frame can be used in common for many attachment portions having different inner diameters of the through bores. FIGS. 28 and 29 show the fishing line guides which have attachment portions having different inner diameters. FIG. 28 shows the fishing line guide in which the frame is coupled to the attachment portion having the through bore having a relatively small inner diameter. The through bore 1311A of the attachment portion shown in FIG. 28 has an inner diameter indicated by reference symbol D1. FIG. 29 shows the fishing line guide in which the same frame as the frame shown in FIG. 28 is coupled to the attachment portion having the through bore having an inner diameter greater than the inner diameter of the through bore shown in FIG. 28. The through bore 1311B of the attachment portion shown in FIG. 29 has an inner diameter indicated by reference symbol D2. As shown in FIGS. 28 and 29, the through bores 1311A and 1311B of the attachment portions have different inner diameters, but the same frame 1200 is coupled to all of the attachment portions. Thus, the fishing line guide according to one embodiment is configured to enable the frames 1200 having the same shape and dimension to be coupled to a plurality of the attachment portions 1300 having the through bores 1311A and 1311B having different inner diameters.

According to one embodiment, a plurality of fishing line guides, which have guide rings of the same size and frames of the same size, can be attached to the rod body 111 in the fishing rod shown in FIG. 1. By way of example, an outer diameter of the rod body 111 disposed at the tip side of the fishing rod may be selected within a range of 1.0 mm to 7.0 mm. The through bores of the attachment portions 1300 according to the embodiments may be formed so as to correspond to the outer diameters of the rod body 111 within the aforementioned range of 1.0 mm to 7.0 mm. Therefore, the attachment portions 1300 according to the embodiments may be configured with various sizes so as to have the through bores adapted to the various outer diameters of the rod body 111. The guide rings of the same size and the frames of the same size can be applied to a variety of the attachment portions 1300 having various inner diameters. Where the fishing line guides according to the embodiments are attached to the rod body 111 disposed at the tip side of the fishing rod, the attachment portions 1300 of various sizes are used, but the same guide rings 1100 and the same frames 1200 can be applied to those attachment portions 1300. Accordingly, the fishing line guides according to one embodiment can be applied to the rod body 111 disposed at the tip side in the state where the fishing line guides include the same guide rings and the same frames. In such a case, the attachment portions of a plurality of the fishing line guides have through bores of various sizes so as to correspond to the rod body 111 having the outer diameter decreasing gradually toward the tip side of the fishing rod. And, the closer the attachment portions are located to the tip side of the fishing rod, the smaller the inner diameters of the through bores are. However, as described above, the same frames can be used in common for various attachment portions having the through bores having different inner diameters. Therefore, the fitting hole can be designed in common for various attachment portions. Accordingly, the number and cost of metal dies for working the frames 1200 can be reduced. Further, development time required for commercialization of the fishing line guide (e.g., time for designing the metal dies, time for manufacturing the metal dies) can be shortened.

Figure 30:
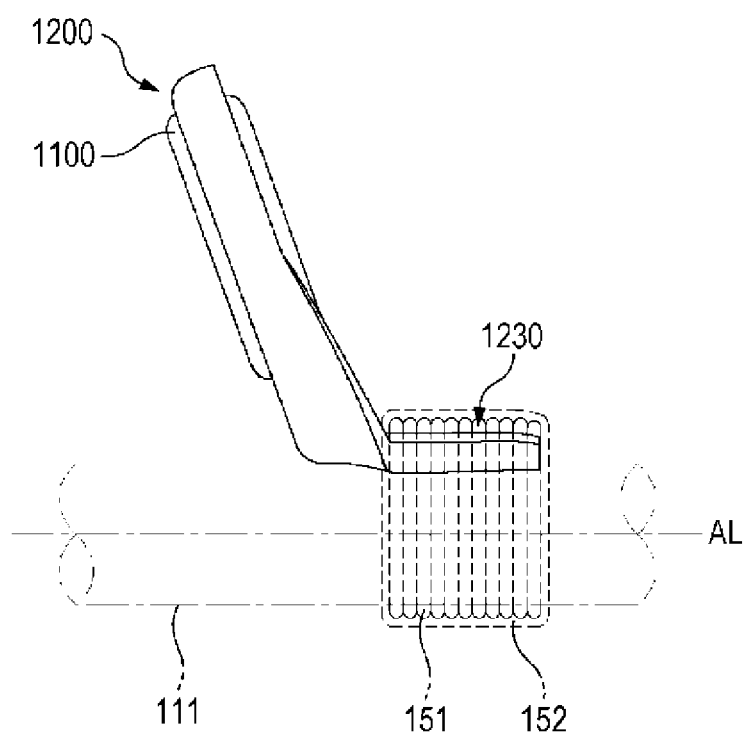
FIG. 30 is a side view showing an example where an assembly of a guide ring and a frame of one embodiment is used as a thread-wrapping type guide.
Figure 31:
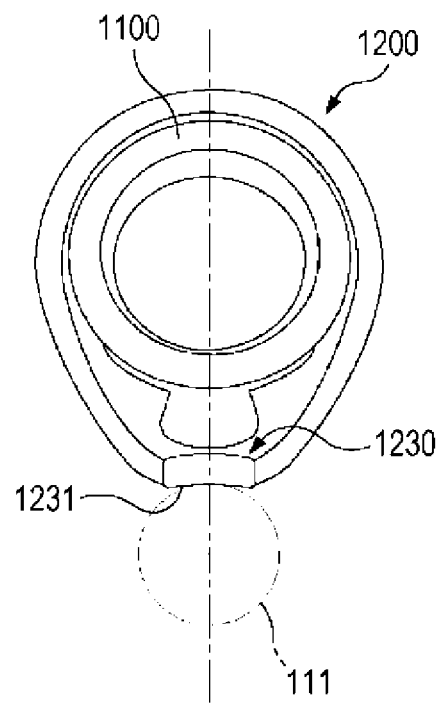
FIG. 31 is a rear view showing an example where an assembly of a guide ring and a frame of one embodiment is used as a thread-wrapping type guide.
Figure 32:
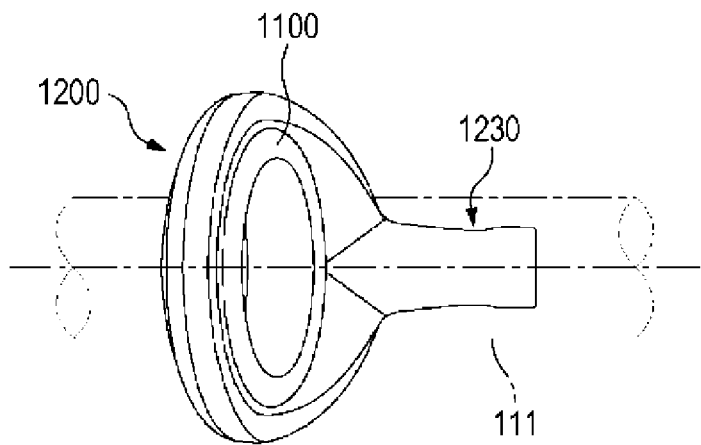
FIG. 32 is a plan view showing an example where an assembly of a guide ring and a frame of one embodiment is used as a thread-wrapping type guide.

The fishing line guide according to one embodiment has the frame partially coupled to the attachment portion. The frame holds the guide ring and has the attachment foot to be coupled to the attachment portion. The attachment foot provided in the frame may function to be coupled to the attachment portion, but may be used so as to be directly attached to the rod body of the fishing rod. The assembly of the guide ring and the frame, which are provided in the fishing line guide according to one embodiment, may be configured as a thread-wrapping type guide which is configured to be firmly fixed to the outer peripheral surface of the rod body by means of a wrapping thread. FIGS. 30 to 32 show examples where the assembly of the guide ring and the frame of the fishing line guide is attached to the rod body as a thread-wrapping type guide.

Referring to FIGS. 30 to 32, the assembly of the guide ring 1100 and the frame 1200 can be attached to the rod body 111 as a thread-wrapping type guide. The attachment foot 1230 of the frame 1200 can contact the outer peripheral surface of the rod body 111 at the lower surface thereof. The attachment foot 1230 can be firmly fixed to the rod body 111 by a wrapping thread 151. That is, the attachment foot 1230 is brought into contact with the outer peripheral surface of the rod body 111 and then the wrapping thread 151 is densely wound around both the attachment foot 1230 and a portion of the rod body 111 where the attachment foot 1230 is located, thereby firmly fixing the attachment foot 1230 to the rod body 111. After the wrapping thread 151 is wound, epoxy resin may be applied to the wound wrapping thread as an adhesive agent 152. When the adhesive agent 152 is hardened, an epoxy coating can be formed throughout the wound wrapping thread 151. Accordingly, the assembly of the guide ring 1100 and the frame 1200 provided in the fishing line guide according to one embodiment can be used as the thread-wrapping type guide without being coupled to the attachment portion.

In the fishing line guide according to one embodiment, the attachment foot of the frame is fitted into the fitting hole of the attachment portion and is coupled to the attachment portion by means of the adhesive agent. Further, a portion of the adhesive agent bonds the attachment portion and the surface of the support leg of the frame by virtue of the pressing portion of a convex shape, and the adhesive agent does not flow outwardly from the support leg of the frame by virtue of the pair of ridges. The fishing line guide of one embodiment, which has the aforementioned configuration, has a highly reliable and strong coupling strength between the attachment foot and the attachment portion. To check the coupling strength of the fishing line guide according to one embodiment, a test for measuring the coupling strength was conducted on the fishing line guide according to one embodiment and the fishing line guide according to a comparative example.

Figure 33:
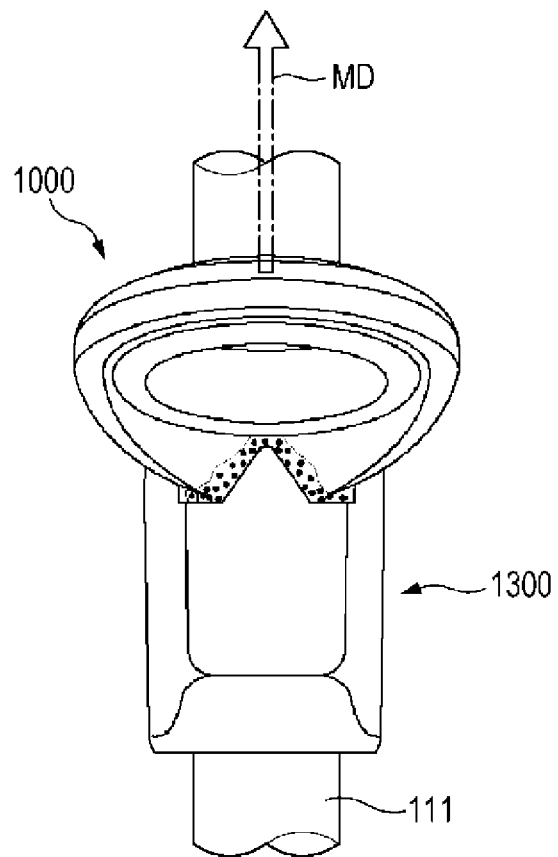
FIG. 33 shows an example of a strength measurement test on a fishing line guide according to one embodiment.

FIG. 33 shows one example of the aforementioned coupling strength measuring test. The fishing line guide used as a test example is the fishing line guide 1000 according to one embodiment. In FIG. 33, an arrow MD indicates a direction of strength measurement. As shown in FIG. 33, the coupling force or the coupling strength can be measured between the attachment foot of the frame and the attachment portion in the fishing line guide according to one embodiment.

Table 1 below is a table showing results of a strength measurement test on the fishing line guide according to a test example and the fishing line guide according to a comparative example.

TABLE 1

| Strength (N) | 1 | 2 | 3 | Ave. |
|---|---|---|---|---|
| Test example | 102.8 | 118.5 | 117.7 | 113.0 |
| Comparative example of movable guide | 6.8 | 7.3 | 7.0 | 7.0 |
| Example of thread-wrapping type guide | 134.8 | — | — | 134.8 |

In Table 1 above, the "test example" is the fishing line guide according to one embodiment shown in FIG. 33. In Table 1 above, the "comparative example of movable guide" is a conventional movable guide. In Table 1 above, the "example of thread-wrapping type guide" is a thread-wrapping type guide which has a frame configured similarly to the frame of the fishing line guide according to the test example. In the thread-wrapping type guide, the strength measurement was conducted in the state where the attachment foot of the frame was firmly fixed to the rod body by a wrapping thread and an epoxy coating was formed on the wrapping thread.

Referring to Table 1 above, the strength of the conventional movable guide has a value of about 5% of the strength of the thread-wrapping type guide. Consequently, the conventional movable guide cannot achieve sufficient functions as a movable guide for a telescopic type fishing rod. Further, it can be confirmed that the fishing line guide according to one embodiment has a strength sixteen times higher than the strength of the conventional movable guide. In addition, it can be confirmed that the fishing line guide according one embodiment has a strength approximately equal to the attachment foot strength of the thread-wrapping type guide. Since the fishing line guide according to one embodiment has a structure in which the adhesive agent is brought into close contact with the surface of the frame by the pressing portion, the coupling force between the attachment foot and the attachment portion can be enhanced at a high level. Further, the fishing line guide according to one embodiment not only has advantages as a movable guide which is attached to the rod body disposed at the tip side in the telescopic type fishing rod, but also has sufficient coupling force and sufficient coupling strength at a level equal to the thread-wrapping type guide.

Figure 34:
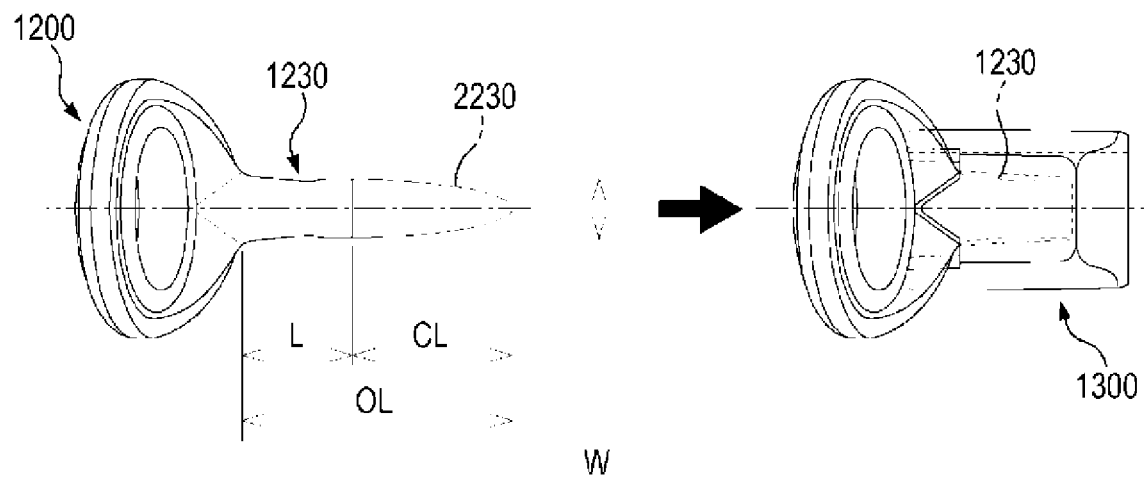
FIG. 34 is a plan view showing an assembly of a guide ring and a frame according to one embodiment and a fishing line guide according to one embodiment.

The assembly of the guide ring and the frame, which the fishing line guide according to one embodiment includes, can be applied as a thread-wrapping type guide by itself. Further, the assembly of the guide ring and the frame according to one embodiment can be manufactured from a conventional thread-wrapping type guide. The conventional thread-wrapping type guide has a thread-wrapping type attachment foot that has a relatively long length. Such a thread-wrapping type attachment foot is configured to be directly attached to the outer peripheral surface of the rod body of the fishing rod by means of a wrapping thread (e.g., the wrapping thread shown in FIG. 30). The attachment foot according to one embodiment can be manufactured by cutting a portion away from the conventional thread-wrapping type attachment foot by a predetermined length. FIG. 34 is a plan view showing the assembly of the guide ring and the frame according to one embodiment and the fishing line guide according to one embodiment.

In FIG. 34, the attachment foot shown by an alternate long and short dash line corresponds to a thread-wrapping type attachment foot 2230 which is employed in the conventional thread-wrapping type guide. The thread-wrapping type attachment foot 2230 is not coupled to the attachment portion 1300. The attachment foot 1230 of the frame 1200 according to one embodiment can be manufactured by cutting a portion away from the thread-wrapping type attachment foot 2230 of the conventional thread-wrapping type guide by a cutting length CL. The cutting length CL may be determined so as to be 50% to 65% of an overall length OL of the thread-wrapping type attachment foot 2230. Therefore, the conventional thread-wrapping type attachment foot 2230 may have an overall length OL of 1.6 times to 2 times of the overall length L of the attachment foot 1230 of one embodiment. The attachment foot 1230 of one embodiment, whose ratio of the overall width W to the overall length L is in the range of 1:1.15 to 1:1.18, can be obtained from the thread-wrapping type attachment foot 2230.

In a case where the attachment foot 1230 is obtained by cutting a portion away from the thread-wrapping type attachment foot 2230 of the conventional thread-wrapping type guide by the cutting length CL, the assembly of the guide ring and the frame according to one embodiment has a weight lighter than that of the conventional thread-wrapping type guide. Table 2 below shows results of measuring the weight of the assembly of the guide ring and the frame according to one embodiment and the weight of the conventional thread-wrapping type guide.

TABLE 2

| | Weight (g) | Embodiment 1 | Embodiment 2 | Embodiment 3 | Embodiment 4 | Embodiment 5 |
|---|---|---|---|---|---|---|
| | Outer diameter of rod body | 1.8 mm | 2.3 mm | 2.9 mm | 4.2 mm | 4.9 mm |
| Embodiment | Weight of frame assembly | 0.112 | 0.112 | 0.112 | 0.112 | 0.139 |
| | Weight of attachment portion | 0.031 | 0.036 | 0.042 | 0.054 | 0.062 |
| | Sum of weight | 0.143 | 0.147 | 0.153 | 0.166 | 0.200 |
| Comparative example | Weight of thread-wrapping type guide | 0.126 | 0.126 | 0.126 | 0.126 | 0.155 |
| | Weight of wrapping thread and epoxy adhesive agent | 0.045 | 0.056 | 0.069 | 0.097 | 0.119 |
| | Sum of weight | 0.171 | 0.182 | 0.195 | 0.223 | 0.274 |
| | Weight reduction | 83% | 81% | 79% | 74% | 73% |

In Table 2 above, the "embodiment" is the fishing line guide according to one embodiment, and has attachment feet in which the inner diameters of the through bores are different so as to be adapted to the outer diameter of the rod body. The "comparative example" is the conventional thread-wrapping type guide, and has an attachment foot corresponding to the shape of the thread-wrapping type attachment foot 2230 shown in FIG. 34. That is, the "comparative example" is the thread-wrapping type guide having the thread-wrapping type attachment foot which is not cut by the cutting length CL shown in FIG. 34. It can be confirmed from Table 2 above that the fishing line guide according to one embodiment has a weight lighter by 73% to 83% than the weight of the conventional thread-wrapping type guide (including the weight of a wrapping thread and epoxy adhesive agent) and the fishing line guide according to one embodiment is further reduced in weight.

As described above, in the assembly of the guide ring and the frame according to one embodiment, the attachment foot can be obtained by cutting a portion away from the thread-wrapping type attachment foot of the conventional thread-wrapping type guide by a predetermined length dimension. Therefore, the fishing line guide according to one embodiment has a weight lighter than the weight of the conventional thread-wrapping type guide having a relatively long attachment foot. The fishing line guide of one embodiment can be applied to the telescopic type fishing rod shown in FIG. 1, but can also be applied to a joined type fishing rod. Generally, only the thread-wrapping type guides can be used in the joined type fishing rod because of a joined structure between rod bodies. However, for weight reduction of a fishing rod, the fishing line guides according to one embodiment can be applied to the joined type fishing rod.

Figure 35:
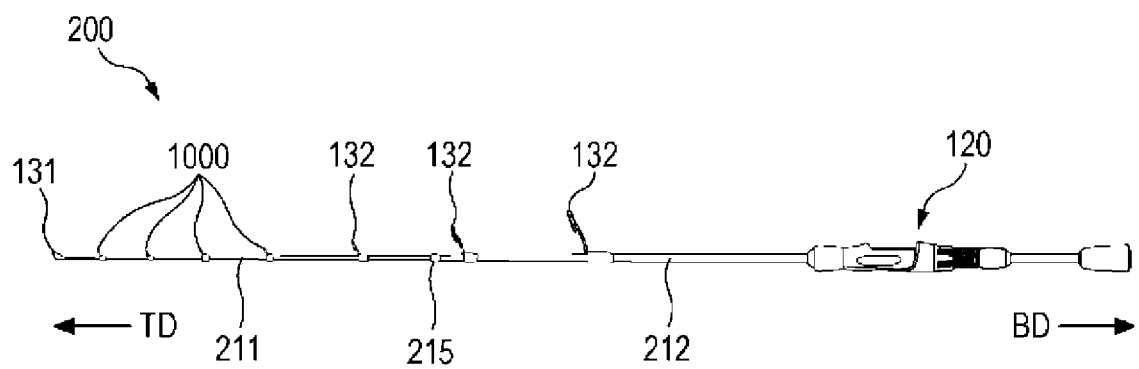
FIG. 35 is a side view showing another example of a fishing rod including the fishing line guide according to one embodiment of the present disclosure.

FIG. 35 shows another example of the fishing rod including the fishing line guides according to one embodiment. A fishing rod 200 shown in FIG. 35 may be referred to as a joined type fishing rod in the present field. The fishing rod 200 may include a rod body 211 and a rod body 212. By way of example, the rod body 211 and the rod body 212 can be interconnected in such a manner that a rear end portion of the rod body 211 is fitted into a front end portion of the rod body 212, and a joined portion 215 may be provided between the rod body 211 and the rod body 212.

The fishing rod 200 includes a plurality of fishing line guides attached to the rod bodies. A thread-wrapping type guide 132 can be used as the plurality of fishing line guides. The thread-wrapping type guide 132 may be fixed to the rod body 212 and a portion of the rod body 212 by using a wrapping thread and epoxy adhesive agent. The rod body 211 is disposed at the tip side of the fishing rod, and the fishing line guides 1000 according to one embodiment may be attached to the rod body 211. Since the fishing line guides 1000 are a movable guide as described above, the fishing line guides 1000 can be attached to the rod body 211 through interference fit at their respective attachment portions. The fishing line guides 1000 can be attached to the rod body 211 with a sufficient fitting strength and can show a sufficient coupling strength between the frame and the attachment portion.

Since the rod body 211 is disposed at the tip side of the fishing rod 200, the fishing line guides 1000 attached to the rod body 211 can be used as a so-called tip guide. All of the fishing line guides, which are installed in the vicinity of the tip of the fishing rod 200, may have guide rings of the same size and frames of the same size. Accordingly, the fishing line guides 1000, which are reduced in weight and have parts of the same size, are attached to the tip section of the joined type fishing rod 200, thereby contributing to the weight reduction of the fishing rod 200.

The technical idea of the present disclosure has been described heretofore with reference to some embodiments and examples shown in the accompanying drawings. However, it is to be understood that various substitutions, modifications and alterations may be made without departing from the technical idea and scope of the present disclosure that can be understood by those of ordinary skill in the technical field to which the present disclosure pertains. Further, it is to be understood that such substitutions, modifications and alterations fall within the scope of the appended claims.

What is claimed is:

1. A fishing line guide attached to a rod body of a fishing rod, comprising:
   a guide ring through which a fishing line passes;
   a frame configured to support the guide ring and having, at a lower end thereof, an attachment foot extending along a longitudinal direction of the rod body; and
   an attachment portion having a through bore to which the rod body is fitted in the longitudinal direction, the attachment portion being composed of a resin material and coupled to the attachment foot,
   wherein the attachment portion includes a fitting hole to which the attachment foot is fitted, and
   wherein the fitting hole is spaced apart along the longitudinal direction from one end surface of the attachment portion in the longitudinal direction and is formed at an outside of the through bore separately from the through bore in a radial direction,
   wherein the attachment portion includes a pressing portion protruding toward the frame along the longitudinal direction above the fitting hole, and
   wherein the pressing portion has a protruding end defining, between the pressing portion and a surface of the frame located opposite the pressing portion along the longitudinal direction, an adhesive space in which a portion of an adhesive agent accommodated in the fitting hole is disposed,
   wherein the frame has, in the surface, a concave portion having a shape complementary to the protruding end of the pressing portion, and
   wherein the protruding end and the concave portion are bonded at the adhesive space by the portion of the adhesive agent.

2. The fishing line guide of claim 1, wherein the attachment portion includes a pair of ridges protruding from an outer peripheral surface of the attachment portion outwardly in the radial direction between the one end surface and the fitting hole and spaced apart from each other in a width direction orthogonal to the longitudinal direction, and
   wherein each of the pair of ridges is formed so as to contact a lateral surface of the frame which is located adjacent to the attachment foot fitted to the fitting hole.

3. The fishing line guide of claim 2, wherein the fishing line guide is configured to enable the frame having the same shape and dimension to be coupled to a plurality of attachment portions having through bores having different inner diameters.

4. The fishing line guide of claim 2, wherein a ratio of an overall width to an overall length of the attachment foot is in a range of 1:1.15 to 1:1.8, and
   wherein the attachment foot is manufactured from a thread-wrapping type attachment foot which is configured not to be coupled to the attachment portion and to be directly attached to an outer peripheral surface of the rod body by a wrapping thread, and which has an overall length of 1.6 times to 2 times of the overall length of the attachment foot.

5. The fishing line guide of claim 1, wherein the frame includes a support leg configured to support the guide ring and to connect with the attachment foot by being bent with respect to the attachment foot, and wherein the concave portion is formed between the attachment foot and the support leg.

6. The fishing line guide of claim 1, wherein the fishing line guide is configured to enable the frame having the same shape and dimension to be coupled to a plurality of attachment portions having through bores having different inner diameters.

7. The fishing line guide of claim 1, wherein a ratio of an overall width to an overall length of the attachment foot is in a range of 1:1.15 to 1:1.8, and wherein the attachment foot is manufactured from a thread-wrapping type attachment foot which is configured not to be coupled to the attachment portion and to be directly attached to an outer peripheral surface of the rod body by a wrapping thread, and which has an overall length of 1.6 times to 2 times of the overall length of the attachment foot.

8. The fishing line guide of claim 2, wherein the frame includes a support leg configured to support the guide ring and to connect with the attachment foot by being bent with respect to the attachment foot, and wherein the concave portion is formed between the attachment foot and the support leg.

9. A fishing rod comprising:

a plurality of rod bodies interconnected in a longitudinal direction; and the fishing line guide of claim 1, wherein the fishing line guide is attached to the rod body disposed at a tip side among the plurality of rod bodies.

10. A fishing rod comprising:

a plurality of rod bodies interconnected in a longitudinal direction; and the fishing line guide of claim 2, wherein the fishing line guide is attached to the rod body disposed at a tip side among the plurality of rod bodies.

* * * * *